US010705030B2

(12) United States Patent
Watanabe

(10) Patent No.: US 10,705,030 B2
(45) Date of Patent: Jul. 7, 2020

(54) X-RAY DEVICE, X-RAY IRRADIATION METHOD, AND MANUFACTURING METHOD FOR STRUCTURE

(71) Applicant: NIKON CORPORATION, Chiyoda-ku, Tokyo (JP)

(72) Inventor: Takashi Watanabe, Naka-gun (JP)

(73) Assignee: Nikon Corporation, Tokyo (JP)

(*) Notice: Subject to any disclaimer, the term of this patent is extended or adjusted under 35 U.S.C. 154(b) by 395 days.

(21) Appl. No.: 14/221,319

(22) Filed: Mar. 21, 2014

(65) Prior Publication Data

US 2014/0283385 A1    Sep. 25, 2014

Related U.S. Application Data

(63) Continuation of application No. PCT/JP2012/075612, filed on Oct. 3, 2012.

(30) Foreign Application Priority Data

Oct. 4, 2011    (JP) ................. 2011-220259

(51) Int. Cl.
*G01N 23/04*    (2018.01)
*G01N 23/046*    (2018.01)
(Continued)

(52) U.S. Cl.
CPC .......... *G01N 23/046* (2013.01); *G01N 23/04* (2013.01); *G01N 23/18* (2013.01); *H01J 35/04* (2013.01);
(Continued)

(58) Field of Classification Search
CPC ......... G01N 2223/31; G01N 2223/419; G01N 23/04; G01N 23/046; G01N 23/18;
(Continued)

(56) References Cited

U.S. PATENT DOCUMENTS 4,064,411 A * 12/1977 Iwasaki .................. H01J 35/12
378/141
4,130,759 A * 12/1978 Haimson ................ A61B 6/032
378/10
(Continued)

FOREIGN PATENT DOCUMENTS

CN        1949450 B      4/2007
DE    102009019215 A1 * 11/2010    ........... G01N 23/046
(Continued)

OTHER PUBLICATIONS

PTO 16-109228 English translation of DE 102009019215 A1.*
(Continued)

*Primary Examiner* — Allen C. Ho
(74) *Attorney, Agent, or Firm* — Finnegan, Henderson, Farabow, Garrett & Dunner, L.L.P.

(57) ABSTRACT

Provided is an x-ray device capable of suppressing reduction in detection precision. The X-ray device irradiates x-rays on an object and detects X-rays that pass through the object. The X-ray device comprises: an X-ray source that emits X-rays; a stage that holds the object; a detection device that detects at least some of the x-rays that have been emitted from the X-ray source and have passed through the object; a chamber member that forms an internal space wherein the X-ray source, the stage, and the detection device are arranged; and a partitioning section that separates the internal space into a first space wherein the X-ray source is arranged and a second space wherein the detection device is arranged.

18 Claims, 24 Drawing Sheets

(51) Int. Cl.
*G01N 23/18* (2018.01)
*H01J 35/06* (2006.01)
*H01J 35/08* (2006.01)
*H01J 35/12* (2006.01)
*H01J 35/14* (2006.01)
*H01J 35/16* (2006.01)
*H05G 1/04* (2006.01)
*H05G 1/06* (2006.01)
*H05G 1/02* (2006.01)
*H01J 35/04* (2006.01)

(52) U.S. Cl.
CPC ............ *H01J 35/045* (2013.01); *H01J 35/06* (2013.01); *H01J 35/08* (2013.01); *H01J 35/12* (2013.01); *H01J 35/16* (2013.01); *H05G 1/025* (2013.01); *H05G 1/04* (2013.01); *H05G 1/06* (2013.01); *G01N 2223/31* (2013.01); *G01N 2223/419* (2013.01); *H01J 35/116* (2019.05); *H01J 35/14* (2013.01); *H01J 2235/1216* (2013.01); *H01J 2235/1262* (2013.01); *Y10T 29/49616* (2015.01)

(58) Field of Classification Search
CPC ......... H01J 2235/087; H01J 2235/1216; H01J 2235/1262; H01J 35/14; H01J 35/06; H01J 35/08; H01J 35/12; H01J 35/04; H01J 35/045; H01J 35/16; H01J 35/116; H05G 1/025; H05G 1/04; H05G 1/06; Y10T 29/49616
USPC ........ 378/51–55, 57, 58, 130, 143, 10, 98.6, 378/137, 138, 199, 200, 16, 19, 20, 62
See application file for complete search history.

(56) References Cited

U.S. PATENT DOCUMENTS

| | | | | |
|---|---|---|---|---|
| 4,355,410 A * | 10/1982 | Sullins | ............... | H05G 1/025 378/199 |
| 4,989,225 A * | 1/1991 | Gupta | ............... | G01N 23/046 378/10 |
| 5,119,408 A * | 6/1992 | Little | ............... | G01N 23/046 378/10 |
| 5,228,071 A * | 7/1993 | Kamata | ............... | G01N 23/046 378/20 |
| 5,312,294 A * | 5/1994 | Meline | ............... | F24F 3/1607 454/190 |
| 5,528,658 A * | 6/1996 | Hell | ............... | H01J 35/14 378/121 |
| 5,563,923 A * | 10/1996 | Okada | ............... | H01J 35/04 378/138 |
| 5,594,768 A | 1/1997 | Fujii et al. | | |
| 5,719,914 A * | 2/1998 | Rand | ............... | G01N 23/046 378/10 |
| 5,940,469 A * | 8/1999 | Hell | ............... | H01J 35/08 378/136 |
| 6,047,041 A * | 4/2000 | Ellinger | ............... | G01N 23/04 378/57 |
| 6,104,776 A * | 8/2000 | Oikawa | ............... | G01N 23/20025 378/10 |
| 6,160,869 A * | 12/2000 | Zapalac | ............... | H01J 35/14 378/10 |
| 6,381,305 B1 * | 4/2002 | Okada | ............... | H01J 35/14 378/137 |
| 6,385,294 B2 * | 5/2002 | Suzuki | ............... | H01J 5/52 378/121 |
| 6,463,123 B1 * | 10/2002 | Korenev | ............... | G21K 5/10 378/119 |
| 6,526,122 B2 * | 2/2003 | Matsushita | ............... | H01J 35/06 378/121 |
| 6,553,094 B1 * | 4/2003 | Bernardi | ............... | G01N 23/046 378/21 |
| 6,580,780 B1 * | 6/2003 | Miller | ............... | H01J 35/12 378/130 |
| 6,639,969 B2 * | 10/2003 | Ochiai | ............... | H01J 3/028 378/101 |
| 6,643,351 B2 * | 11/2003 | Morita | ............... | A61B 6/032 378/4 |
| 6,670,625 B1 * | 12/2003 | Rand | ............... | G21K 1/087 250/396 ML |
| 6,687,332 B2 * | 2/2004 | Smyth | ............... | A61B 6/4028 378/10 |
| 6,807,248 B2 * | 10/2004 | Mihara | ............... | A61B 6/032 378/10 |
| 6,952,466 B2 * | 10/2005 | Garewal | ............... | H01J 35/06 378/10 |
| 7,056,017 B2 * | 6/2006 | Daniel | ............... | H05G 1/02 378/141 |
| 7,072,439 B2 * | 7/2006 | Radley | ............... | G01N 23/12 378/47 |
| 7,082,182 B2 * | 7/2006 | Zhou | ............... | A61B 6/032 378/10 |
| 7,110,506 B2 * | 9/2006 | Radley | ............... | G01N 23/12 378/141 |
| 7,186,021 B1 | 3/2007 | Breham et al. | | |
| 7,186,022 B2 * | 3/2007 | Charles, Jr. | ............... | H01J 35/08 378/199 |
| 7,203,269 B2 * | 4/2007 | Huber | ............... | H01J 35/06 378/10 |
| 7,209,545 B2 * | 4/2007 | Radley | ............... | G01N 23/12 378/137 |
| 7,236,570 B2 * | 6/2007 | Canfield | ............... | H05G 1/04 378/141 |
| 7,254,211 B2 * | 8/2007 | Hunt | ............... | G01N 23/046 378/20 |
| 7,280,638 B1 * | 10/2007 | Weaver | ............... | H01J 35/16 378/130 |
| 7,281,850 B2 * | 10/2007 | Varadharajan | ......... | A61B 6/032 378/10 |
| 7,286,644 B2 * | 10/2007 | Andrews | ............... | H05G 1/52 378/138 |
| 7,295,651 B2 * | 11/2007 | Delgado | ............... | G01N 23/046 378/10 |
| 7,340,029 B2 * | 3/2008 | Popescu | ............... | A61B 6/032 378/10 |
| 7,349,525 B2 * | 3/2008 | Morton | ............... | H01J 35/08 378/124 |
| 7,354,197 B2 * | 4/2008 | Bhatt | ............... | G01N 23/046 378/200 |
| 7,356,115 B2 * | 4/2008 | Ford | ............... | G01N 23/046 378/4 |
| 7,416,333 B2 * | 8/2008 | Zhang | ............... | F04D 29/541 378/199 |
| 7,428,297 B2 * | 9/2008 | Eilbert | ............... | G01N 23/2252 378/10 |
| 7,430,279 B2 | 9/2008 | Freudenberger et al. | | |
| 7,440,543 B2 * | 10/2008 | Morton | ............... | G01F 1/66 378/10 |
| 7,466,799 B2 * | 12/2008 | Miller | ............... | H01J 35/16 378/121 |
| 7,486,777 B2 * | 2/2009 | Umemura | ............... | A61B 6/035 378/141 |
| 7,492,862 B2 * | 2/2009 | Bendahan | ............... | G01V 5/0041 378/195 |
| 7,508,908 B2 * | 3/2009 | Hu | ............... | G01N 9/24 378/54 |
| 7,522,706 B2 * | 4/2009 | Lu | ............... | H05G 1/04 378/130 |
| 7,543,987 B2 * | 6/2009 | Canfield | ............... | A61B 6/40 378/141 |
| 7,558,376 B2 * | 7/2009 | Anno | ............... | H01J 35/103 378/125 |
| 7,634,045 B2 * | 12/2009 | Popescu | ............... | A61B 6/032 378/10 |
| 7,634,055 B2 * | 12/2009 | Hu | ............... | G01N 23/10 378/53 |
| 7,643,606 B2 * | 1/2010 | Popescu | ............... | A61B 6/032 378/10 |

(56) References Cited

U.S. PATENT DOCUMENTS

| | | | | |
|---|---|---|---|---|
| 7,646,852 B2* | 1/2010 | Harding | ............... | H05G 1/52 378/111 |
| 7,647,189 B2* | 1/2010 | Kang | ............... | G01N 23/046 378/53 |
| 7,664,229 B2* | 2/2010 | Okada | ............... | H01J 35/08 378/121 |
| 7,672,426 B2* | 3/2010 | Seppi | ............... | G01N 23/046 378/20 |
| 7,688,937 B2* | 3/2010 | Schomberg | ............... | A61B 6/032 378/10 |
| 7,688,949 B2* | 3/2010 | Warburton | ............... | H01J 35/18 378/140 |
| 7,738,632 B2* | 6/2010 | Popescu | ............... | A61B 6/032 378/136 |
| 7,809,113 B2* | 10/2010 | Aoki | ............... | G01N 23/223 378/124 |
| 7,839,967 B2* | 11/2010 | Grass | ............... | A61B 6/032 378/10 |
| 7,872,241 B2* | 1/2011 | Rand | ............... | H01J 35/08 250/396 ML |
| 7,876,875 B2* | 1/2011 | Warner | ............... | G01N 23/046 378/10 |
| 7,876,881 B2* | 1/2011 | Jeffery | ............... | A61B 6/032 378/10 |
| 7,983,384 B2* | 7/2011 | Hampel | ............... | A61B 6/032 378/10 |
| 8,036,341 B2* | 10/2011 | Lee | ............... | H01J 35/08 378/143 |
| 8,054,945 B2* | 11/2011 | Andrews | ............... | H01J 35/18 378/140 |
| 8,094,784 B2* | 1/2012 | Morton | ............... | G21K 1/02 378/124 |
| 8,130,897 B2* | 3/2012 | Popescu | ............... | A61B 6/035 378/134 |
| 8,130,899 B2* | 3/2012 | Hampel | ............... | A61B 6/032 378/10 |
| 8,130,910 B2* | 3/2012 | Davies | ............... | H01J 35/16 378/139 |
| 8,160,342 B2* | 4/2012 | Khare | ............... | H04N 19/635 382/131 |
| 8,306,184 B2* | 11/2012 | Chang | ............... | A61N 5/103 378/62 |
| 8,401,143 B2* | 3/2013 | Hampel | ............... | A61B 6/032 378/10 |
| 8,422,626 B2* | 4/2013 | Jin | ............... | G01N 23/046 378/10 |
| 8,503,615 B2* | 8/2013 | Hockersmith | ............... | H05G 1/54 378/127 |
| 8,517,607 B2* | 8/2013 | Yamamoto | ............... | H05G 1/06 378/203 |
| 8,542,793 B1* | 9/2013 | Jin | ............... | G01N 23/046 378/4 |
| 8,675,819 B2* | 3/2014 | Astle | ............... | B22C 7/02 378/130 |
| 8,705,693 B2* | 4/2014 | Hadland | ............... | G01N 23/046 378/21 |
| 8,761,345 B2* | 6/2014 | Shimono | ............... | H01J 35/06 378/140 |
| 8,989,345 B2* | 3/2015 | Kim | ............... | G01N 9/24 378/207 |
| 8,995,616 B2* | 3/2015 | van der Veen | ............... | H01J 35/32 378/65 |
| 9,020,101 B2* | 4/2015 | Omote | ............... | H01J 35/12 378/143 |
| 9,025,724 B2* | 5/2015 | Lee | ............... | G01N 9/24 378/10 |
| 9,070,529 B2* | 6/2015 | Tamura | ............... | H01J 35/12 |
| 9,070,531 B2* | 6/2015 | Ueda | ............... | H05G 1/025 |
| 9,153,408 B2* | 10/2015 | Neuser | ............... | H01J 35/12 |
| 9,234,855 B2* | 1/2016 | Watanabe | ............... | G01N 23/04 |
| 9,263,225 B2* | 2/2016 | Morton | ............... | H01J 35/08 |
| 9,263,226 B2* | 2/2016 | Zhao | ............... | G01N 23/04 |
| 9,281,158 B2* | 3/2016 | Ogura | ............... | H01J 35/18 |
| 9,351,694 B2* | 5/2016 | Anno | ............... | H05G 1/025 |
| 9,355,810 B2* | 5/2016 | Chen | ............... | H01J 35/14 |
| 9,373,478 B2* | 6/2016 | Tamura | ............... | H01J 35/12 |
| 9,420,676 B2* | 8/2016 | Chen | ............... | H05G 1/025 |
| 9,459,216 B2* | 10/2016 | Sivathanu | ............... | G01N 23/04 |
| 9,459,219 B2* | 10/2016 | Gautsch | ............... | G01N 23/20033 |
| 9,953,799 B2* | 4/2018 | Hakoda | ............... | B22D 46/00 |
| 10,483,077 B2* | 11/2019 | Morton | ............... | H01J 35/12 |
| 2002/0154728 A1 | 10/2002 | Morita et al. | | |
| 2007/0092065 A1 | 4/2007 | Freudenberger et al. | | |
| 2009/0268869 A1 | 10/2009 | Hadland | | |
| 2010/0220908 A1 | 9/2010 | Khare et al. | | |
| 2010/0243894 A1* | 9/2010 | Kato | ............... | G01T 7/00 250/336.1 |
| 2010/0303208 A1* | 12/2010 | Baruth | ............... | A61B 6/00 378/98.8 |
| 2012/0155606 A1 | 6/2012 | Simon et al. | | |

FOREIGN PATENT DOCUMENTS

| | | | |
|---|---|---|---|
| JP | 62-232547 | | 10/1987 |
| JP | 63-302311 | | 12/1988 |
| JP | 2-260354 | | 10/1990 |
| JP | 7-306165 | | 11/1995 |
| JP | 2003-139724 | | 5/2003 |
| JP | 2003139724 A | * | 5/2003 |
| JP | 2009-031182 | | 2/2009 |
| JP | 2009-270876 | | 11/2009 |
| JP | 2009300379 A | * | 12/2009 |
| JP | 2010018559 A | * | 1/2010 |
| JP | 2010-185859 | | 8/2010 |
| JP | 2010-212072 | | 9/2010 |
| WO | WO 2009036983 A1 | * | 3/2009 ........... G01N 23/046 |
| WO | WO 2010/124868 | | 11/2010 |

OTHER PUBLICATIONS

Cantatore et al., Introduction to Computed Tomography, Mar. 2011, Technical report, DTU Mechanical Engineering, Technical report, DTU Mechanical Engineering, 76 pages, available at http://orbit.dtu.dk/files/51297792/Introduction_to_CT.pdf.*

Weiss et al., Einfluß der Quellbewegung auf Reproduzierbarkeit und Antastabweichung im Röntgen-Computertomographen, Presented Sep. 2010, Proceeding of Industrielle Comuteromografie conference, pp. 227-234, See attached machine translation).*

PTO 16-108377 for English translationJP 2010-018559 A.*

Sasov et al., X-ray Nanotomography, 2004, SPIE vol. 5535, pp. 201-211.*

GE Sensing & Inspection Technologies, Document No. GEIT-31104EN (Dec. 2009), copyright 2009, 8 pages.*

First Examination Report issued by The State Intellectual Property Office of the P.R. China in counterpart Japanese Application No. 201280056289.8, dated Jun. 30, 2015 (16 pages).

International Search Report from the Japanese Patent Office in International Application No. PCT/JP2012/075612, dated Dec. 25, 2012, 5 pages.

Written Opinion of the International Searching Authority dated Dec. 25, 2012, attached to the International Preliminary Examination Report on Patentability dated Apr. 8, 2014, 16 pages.

Notification of Reasons for Refusal issued by the Japanese Patent Office in counterpart Japanese Application No. 2013-537526, dated Mar. 31, 2015 (7 pages).

Extended European Search Report issued in counterpart European Application No. EP 1283048.2, dated Mar. 25, 2015 (6 pages).

Notification of Reasons for Rejection issued by the Japanese Patent Office in counterpart Japanese Application No. 2013-53526, dated Aug. 5, 2015 (3 pages).

Notice of Reasons fo Rejection of Application issued by the Japanese Patent Office in Japanese Application No. 2013-537526, dated Dec. 4, 2014 (13 pages).

Office Action issued by the State Intellectual Property Office of the People's Republic of China in a counterpart Application No. 201280056289.8 dated Nov. 16, 2016, and English translation thereof.

(56) References Cited

OTHER PUBLICATIONS

Office Action issued by the State Intellectual Property Office of the People's Republic of China dated May 25, 2017 in a counterpart Application No. 201280056289.8, and English translation thereof.

* cited by examiner

Fig. 15
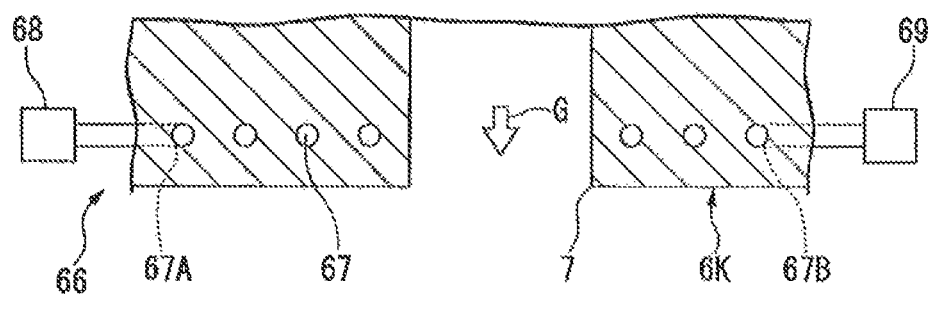
SP1 (SP)
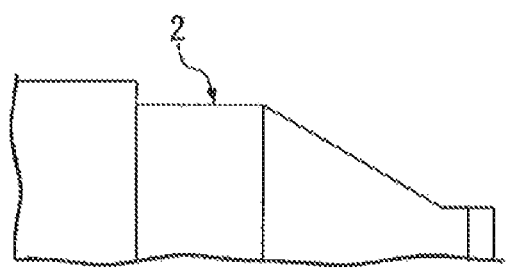
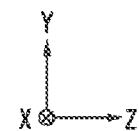

X-RAY DEVICE, X-RAY IRRADIATION METHOD, AND MANUFACTURING METHOD FOR STRUCTURE

CROSS REFERENCE TO RELATED APPLICATIONS

This is a Continuation Application of International Application No. PCT/JP2012/075612 filed on Oct. 3, 2012 which claims priority from Japanese Patent Application No. 2011-220259 filed on Oct. 4, 2011. The contents of the aforementioned applications are incorporated herein by reference in their entireties.

BACKGROUND

Field of the Invention

The present invention relates to an X-ray device, an X-ray irradiation method, and a structure manufacturing method.

Description of the Related Art

As devices nondestructively acquiring internal information of an object, for example, such an X-ray device as disclosed in United States Patent Publication No. 2009/0268869 as recited below is known to irradiate the object with X-ray and detect an X-ray transmitted through that object.

SUMMARY

In an X-ray device, when temperature changes, it is possible that, for example, some members of the X-ray device can undergo thermal distortion or thermal deformation. As a result, a decrease in detection accuracy is possible.

An object of the present invention is to provide an apparatus, an X-ray irradiation method and a structure manufacturing method which are capable of suppressing the decrease in detection accuracy.

According to a first aspect of the present teaching, there is provided an X-ray apparatus configured to irradiate an object with an X-ray and detect a transmission X-ray transmitted through the object, including: an X-ray source configured to irradiate the X-ray; a stage configured to retain the object; a detector configured to detect at least a part of the X-ray which is emitted from the X-ray source and has passed through the object; a chamber member defining an internal space in which the X-ray source, the stage and the detector are placed; and a partition configured to divide the internal space into a first space in which the X-ray source is placed and a second space in which the detector is placed.

According to a second aspect of the present invention, there is provided an X-ray apparatus configured to irradiate an object with an X-ray and detect a transmission X-ray transmitted through the object, including: an X-ray source configured to emit the X-ray; a stage configured to retain the object; a detector configured to detect at least a part of the X-ray which is emitted from the X-ray source and has passed through the object; and a measuring device configured to measure position of the stage, wherein the measuring device has a higher resolution in a first space spatially close to the X-ray source with respect to a radiation direction of the X-ray emitted from the X-ray source than in a second space spatially closer to the detector than the first space.

According to a third aspect of the present invention, there is provided an X-ray apparatus configured to irradiate an object with an X-ray and detect an transmission X-ray transmitted through the object, including: an X-ray source configured to emit the X-ray; a first stage being movable; a second stage being different from the first stage and movable while retaining the object; and a detector configured to detect at least a part of the X-ray which is emitted from the X-ray source and has passed through the object.

According to a fourth aspect of the present invention, there is provided a structure manufacturing method, including: a design step of creating design information with respect to a profile of a structure; a formation step of forming the structure based on the design information; a measuring step of measuring the profile of the formed structure by using the X-ray apparatus according to the first to third aspects of the invention; and an inspection step of comparing information of the profile obtained in the measuring step with the design information.

According to a fifth aspect of the present invention, there is provided an X-ray irradiation method including the steps of: irradiating a known-object with an X-ray from an X-ray source; irradiating the known-object with the X-ray from the X-ray source at a first temperature and detecting, with a detector, a transmission X-ray transmitted through the known object; and calculating relative positions between the X-ray source, the known object and the detector, in irradiating the known-object with the X-ray at the first temperature and detecting the transmission X-ray transmitted through the known object.

According to the above aspects of the present teaching, it is possible to suppress the decrease in detection accuracy.

BRIEF DESCRIPTION OF DRAWINGS

FIG. 15 is a view showing an example of a detection apparatus in accordance with an eleventh embodiment;

DESCRIPTION OF EMBODIMENTS

While a number of embodiments of the present invention will be explained hereinbelow with reference to the accompanying drawings, the present invention is not limited to these embodiments. In the following explanations, an X-Y-Z orthogonal coordinate system is set up, and positional relations between respective parts are explained in reference to this X-Y-Z orthogonal coordinate system. A predetermined direction in a horizontal plane is defined as a Z-axis direction, a direction orthogonal to the Z-axis direction in the horizontal plane is defined as an X-axis direction, and a direction orthogonal respectively to the Z-axis direction and the X-axis direction (namely a vertical direction) is defined as a Y-axis direction. Further, the rotational (inclinational) directions about the X-axis, the Y-axis and the Z-axis are defined as a θX direction, a θY direction and a θZ direction, respectively.

First Embodiment

Figure 1:
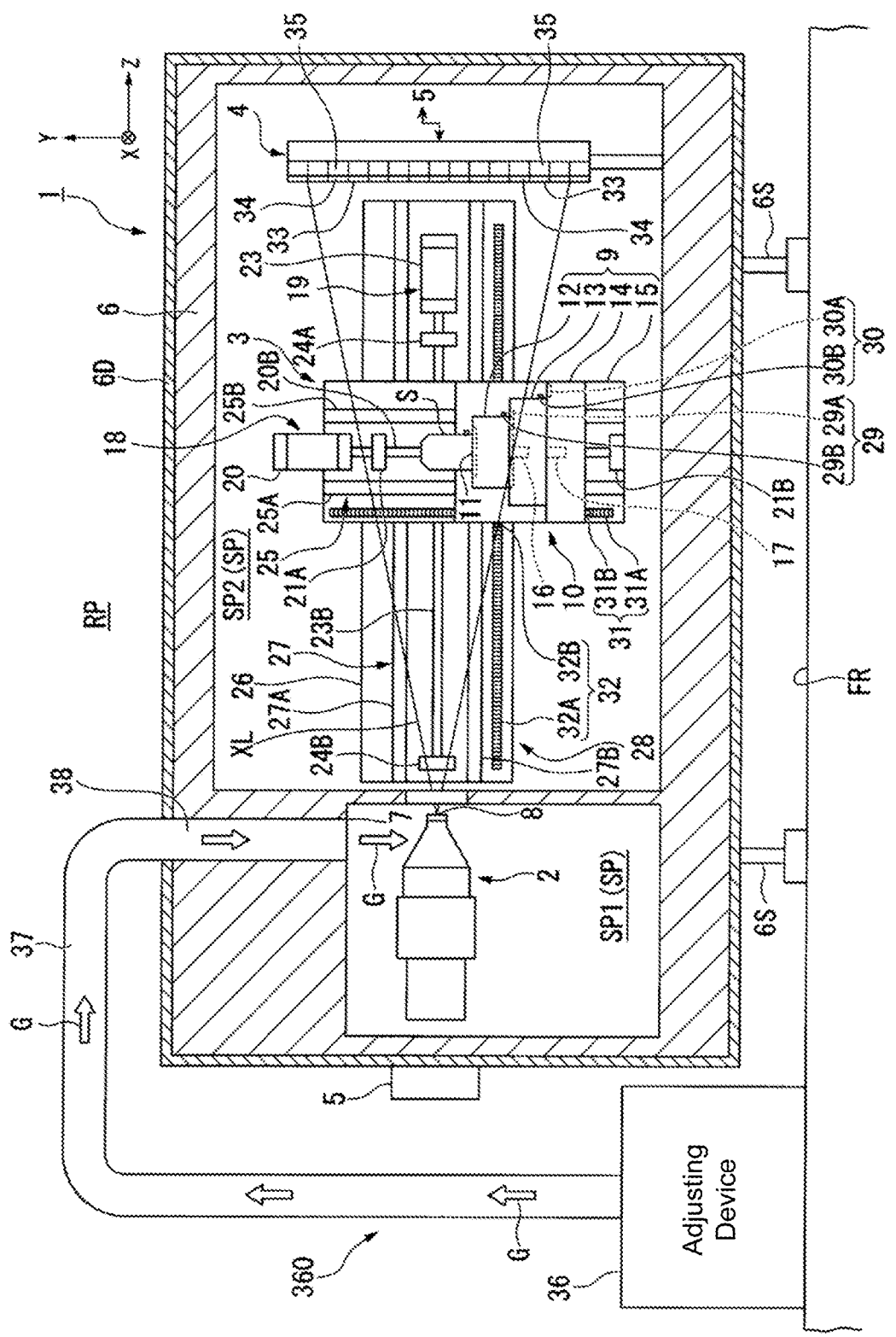
FIG. 1 is a view showing an example of a detection apparatus in accordance with a first embodiment.

A first embodiment will be explained. FIG. 1 is a view showing an example of a detection apparatus 1 in accordance with the first embodiment.

The detection apparatus 1 irradiates a measuring object S with an X-ray XL to detect a transmission X-ray transmitted through the measuring object S. The X-ray is, for example, an electromagnetic wave with a wavelength of approximately 1 pm to 30 nm. The X-ray includes an ultrasoft X-ray with energy of approximately tens of electron volts (eV), a soft X-ray with energy of approximately 0.1 to 2 keV, an X-ray with energy of approximately 2 to 20 keV, and a hard X-ray with energy of approximately 20 to 50 keV.

In the first embodiment, the detection apparatus 1 includes an X-ray device irradiating the measuring object S with the X-ray and detecting the X-ray having passed through the measuring object S. The detection apparatus 1 includes an X-ray CT inspection device configured to irradiate the measuring object S with the X-ray and detecting the X-ray having passed through the measuring object S so as to nondestructively acquire some internal information (the internal structure, for example) of the measuring object S. In the first embodiment, the measuring object S includes components for industrial use such as machine components, electronic components, and the like. The X-ray CT inspection device includes industrial X-ray CT inspection devices which irradiate the components for industrial use with the X-ray to inspect the components for industrial use.

In FIG. 1, the detection apparatus 1 includes an X-ray source 2 emitting the X-ray XL, a movable stage device 3 retaining or holding the measuring object S, a detector 4 detecting at least part of the X-ray being emitted from the X-ray source 2 and having passed through the measuring object S retained or held by the stage device 3, and a control device 5 controlling the operation of the whole detection apparatus 1.

Further, in the first embodiment, the detection apparatus 1 includes a chamber member 6 defining an internal space SP where the X-ray XL emitted from the X-ray source 2 proceeds. In the first embodiment, the X-ray source 2, stage device 3, and detector 4 are disposed or located in the internal space SP.

In the first embodiment, the detection apparatus 1 includes a partitionment portion (a separator or a dividing portion) 100 dividing the internal space SP into a first space SP1 in which the X-ray source 2 is arranged, and a second space SP2 in which the detector 4 is arranged. At least part of the partitionment portion 100 is arranged in the internal space SP. The first space SP1 and the second space SP2 are partitioned by the partitionment portion 100. In the first embodiment, the X-ray source 2 is arranged in the first space SP1. At least part of the stage device 3 and the detector 4 are arranged in the second space SP2.

In the first embodiment, the partitionment portion 100 includes a partitionment member (a separator or a dividing member) 102 arranged in at least a partial portion between the X-ray source 2 and the detector 4. In the first embodiment, the partitionment member 102 has a passage portion 101 through which the X-ray XL from the X-ray source 2 is passable. The X-ray XL emitted from the X-ray source 2 is supplied to the second space SP2 via the passage portion 101.

In the first embodiment, the passage portion 101 includes an opening through which the X-ray XL emitted from the X-ray source 2 is passable. The opening is formed in at least part of the partitionment member 102. Further, the passage portion 101 can otherwise be a transmission member through which the X-ray XL is transmittable. It is possible to use, for example, a beryllium thin film, carbon thin film or the like to form the transmission member. The partitionment member 102 can support the transmission member.

Further, in the first embodiment, the detection apparatus 1 includes an adjusting system 360 adjusting temperature of the first space SP1. In the first embodiment, the adjusting system 360 is controlled by the control device 5. In the first embodiment, the adjusting system 360 includes a supply port 7 supplying a temperature-controlled gas G to the first space SP1. The supply port 7 is arranged in the first space SP1. The supply port 7 faces with the first space SP1. In the first embodiment, the supply port 7 supplies the temperature-controlled gas G to at least part of the X-ray source 2.

In the first embodiment, the chamber member 6 is arranged over a support surface FR. The support surface FR includes a floor surface in a factory or the like. The chamber member 6 is supported by a plurality of support members 6S. The chamber member 6 is arranged over the support surface FR via the support members 6S. In the first embodiment, the support members 6S separate the lower surface of the chamber member 6 from the support surface FR. That is, an interspace is formed between the lower surface of the chamber member 6 and the support surface FR. Further, it is also possible for at least part of the lower surface of the chamber member 6 to contact with the support surface FR.

In the first embodiment, the chamber member 6 contains lead. The chamber member 6 suppresses or prevents the X-ray XL in the internal space SP from leaking out into an external space RP of the chamber member 6.

In the first embodiment, the detection apparatus 1 has a member 6D which is fitted on the chamber member 6 and has a lower thermal conductivity than the chamber member 6. In the first embodiment, the member 6D is arranged on the external surface of the chamber member 6. The member 6D suppresses or prevents the temperature of the internal space SP from being affected by the temperature (temperature change) of the external space RP. That is, the member 6D functions as a thermal insulation member suppressing any heat in the external space RP from transferring into the internal space SP. The member 6D contains plastic, for example. In the first embodiment, the member 6D contains foamed polystyrene, for example.

The X-ray source 2 irradiates the measuring object S with the X-ray XL. In the first embodiment, the X-ray source 2 is exactly a so-called X-ray source. The X-ray source 2 is capable of adjusting the intensity of the X-ray irradiating the measuring object S, based on the X-ray absorption characteristic of the measuring object S. The X-ray source 2 has an emission portion 8 emitting the X-ray XL. The X-ray source 2 constitutes a point X-ray source. In the first embodiment, the emission portion 8 includes the point X-ray source. The X-ray source 2 irradiates the measuring object S with a conical X-ray (a so-called cone beam). Further, the spreading shape of the X-ray emitted from the X-ray source 2 is not limited to a conical shape but, for example, the X-ray can alternatively be fan-like (a so-called fan beam).

The emission portion 8 is directed toward the +Z direction. In the first embodiment, at least part of the X-ray XL emitted from the emission portion 8 proceeds in the +Z direction in the internal space SP. That is, in the first embodiment, the X-ray XL radiates in the Z-axis direction.

The stage device 3 includes a movable stage 9 retaining the measuring object S, and a drive system 10 moving the stage 9.

In the first embodiment, the stage 9 has a table 12 having a retention portion 11 retaining the measuring object S, a first movable member 13 movably supporting the table 12, a second movable member 14 movably supporting the first movable member 13, and a third movable member 15 movably supporting the second movable member 14.

The table 12 is rotatable with the measuring object S being retained by the retention portion 11. The table 12 is movable (rotatable) in the θY direction. The first movable member 13 is movable in the X-axis direction. When the first movable member 13 moves in the X-axis direction, then together with the first movable member 13, the table 12 also moves in the X-axis direction. The second movable member 14 is movable in the Y-axis direction. When the second movable member 14 moves in the Y-axis direction, then together with the second movable member 14, the first movable member 13 and the table 12 also move in the Y-axis direction. The third movable member 15 is movable in the Z-axis direction. When the third movable member 15 moves in the Z-axis direction, then together with the third movable member 15, the second movable member 14, the first movable member 13, and the table 12 also move in the Z-axis direction.

In the first embodiment, the drive system 10 includes a rotary drive device 16 rotating the table 12 on the first movable member 13, a first drive device 17 moving the first movable member 13 in the X-axis direction on the second movable member 14, a second drive device 18 moving the second movable member 14 in the Y-axis direction, and a third drive device 19 moving the third movable member 15 in the Z-axis direction.

The second drive device 18 includes a screw shaft 20B arranged in a nut of the second movable member 14, and an actuator 20 rotating the screw shaft 20B. The screw shaft 20B is rotatably supported by bearings 21A and 21B. In the first embodiment, the screw shaft 20B is supported by the bearings 21A and 21B such that the shaft line of the screw shaft 20B can become substantially parallel to the Y-axis. In the first embodiment, balls are arranged between the screw shaft 20B and the nut of the second movable member 14. That is, the second drive device 18 includes a so-called ball screw drive mechanism.

The third drive device 19 includes a screw shaft 23B arranged in a nut of the third movable member 15, and an actuator 23 rotating the screw shaft 23B. The screw shaft 23B is rotatably supported by bearings 24A and 24B. In the first embodiment, the screw shaft 23B is supported by the bearings 24A and 24B such that the shaft line of the screw shaft 23B can become substantially parallel to the Z-axis. In the first embodiment, balls are arranged between the screw shaft 23B and the nut of the third movable member 15. That is, the third drive device 19 includes another so-called ball screw drive mechanism.

The third movable member 15 has a guide mechanism 25 guiding the second movable member 14 in the Y-axis direction. The guide mechanism 25 includes guide members 25A and 25B elongated in the Y-axis direction. The third movable member 15 supports at least part of the second drive device 18 including the actuator 20, and the bearings 21A and 21B supporting the screw shaft 20B. By letting the actuator 20 rotate the screw shaft 20B, the second movable member 14 moves in the Y-axis direction while being guided by the guide mechanism 25.

In the first embodiment, the detection apparatus 1 has a base member 26. The base member 26 is supported by the chamber member 6. In the first embodiment, the base member 26 is supported by the inner wall (inner surface) of the chamber member 6 via a support mechanism. The position of the base member 26 is substantially fixed.

The base member 26 has a guide mechanism 27 guiding the third movable member 15 in the Z-axis direction. The guide mechanism 27 includes guide members 27A and 27B elongated in the Z-axis direction. The base member 26 supports at least part of the third drive device 19 including the actuator 23, and the bearings 24A and 24B supporting the screw shaft 23B. By letting the actuator 23 rotate the screw shaft 23B, the third movable member 15 moves in the Z-axis direction while being guided by the guide mechanism 27.

Further, while illustration is omitted, in the first embodiment, the second movable member 14 has a guide mechanism guiding the first movable member 13 in the X-axis direction. The first drive device 17 includes a ball screw mechanism capable of moving the first movable member 13 in the X-axis direction. The rotary drive device 16 includes a motor capable of moving (rotating) the table 12 in the θY direction.

In the first embodiment, by virtue of the drive system 10, the measuring object S retained on the table 12 is movable in four directions: the X-axis, Y-axis, Z-axis and θY directions. Further, it is also possible for the drive system 10 to move the measuring object S retained on the table 12 in six directions: the X-axis, Y-axis, Z-axis, θX, θY and θZ directions. Further, in the first embodiment, although the drive system 10 is contrived to include a ball screw drive mechanism, it can alternatively include, for example, a voice coil motor. Still alternatively, the drive system 10 can include, for example, a linear motor or a planar motor.

In the first embodiment, the stage 9 is movable in the internal space SP. The stage 9 is arranged on the +Z side of the emission portion 8. The stage 9 is movable in the second space SP2 on the +Z side from the emission portion 8 within the internal space SP. At least part of the stage 9 can face the emission portion 8 via the passage portion 101. The stage 9 can situate the retained measuring object S in a position facing the emission portion 8. The stage 9 can situate the measuring object S in the X-ray passage of the X-ray XL emitted from the emission portion 8.

In the first embodiment, the detection apparatus 1 includes a measuring system 28 which measures the position of the stage 9. In the first embodiment, the measuring system 28 includes an encoder system.

The measuring system 28 has a rotary encoder 29 measuring the rotational amount of the table 12 (the position with respect to the θY direction), a linear encoder 30 measuring the position of the first movable member 13 with respect to the X-axis direction, another linear encoder 31 measuring the position of the second movable member 14 with respect to the Y-axis direction, and still another linear encoder 32 measuring the position of the third movable member 15 with respect to the Z-axis direction.

In the first embodiment, the rotary encoder 29 measures the rotational amount of the table 12 relative to the first movable member 13. The linear encoder 30 measures the position of the first movable member 13 (the position with respect to the X-axis direction) relative to the second movable member 14. The linear encoder 31 measures the position of the second movable member 14 (the position with respect to the Y-axis direction) relative to the third movable member 15. The linear encoder 32 measures the position of the third movable member 15 (the position with respect to the Z-axis direction) relative to the base member 26.

The rotary encoder 29 includes, for example, a scale member 29A arranged on the first movable member 13, and an encoder head 29B arranged on the table 12 to detect the scale of the scale member 29A. The scale member 29A is fixed on the first movable member 13. The encoder head 29B is fixed on the table 12. The encoder head 29B can measure the rotational amount of the table 12 relative to the scale member 29A (the first movable member 13).

The linear encoder 30 includes, for example, a scale member 30A arranged on the second movable member 14, and an encoder head 30B arranged on the first movable member 13 to detect the scale of the scale member 30A. The scale member 30A is fixed on the second movable member 14. The encoder head 30B is fixed on the first movable member 13. The encoder head 30B can measure the position of the first movable member 13 relative to the scale member 30A (the second movable member 14).

The linear encoder 31 includes a scale member 31A arranged on the third movable member 15, and an encoder head 31B arranged on the second movable member 14 to detect the scale of the scale member 31A. The scale member 31A is fixed on the third movable member 15. The encoder head 31B is fixed on the second movable member 14. The encoder head 31B can measure the position of the second movable member 14 relative to the scale member 31A (the third movable member 15).

The linear encoder 32 includes a scale member 32A arranged on the base member 26, and an encoder head 32B arranged on the third movable member 15 to detect the scale of the scale member 32A. The scale member 32A is fixed on the base member 26. The encoder head 32B is fixed on the third movable member 15. The encoder head 32B can measure the position of the third movable member 15 relative to the scale member 32A (the base member 26).

The detector 4 is arranged in the internal space SP on the +Z side from the X-ray source 2 and the stage 9. The detector 4 is arranged in the second space SP2 on the +Z side from the stage 9. The detector 4 is fixed in a predetermined position. Further, the detector 4 can also be movable. The stage 9 is movable in the space between the X-ray source 2 and the detector 4 within the internal space SP. The stage 9 is movable in the space on the −Z side of the detector 4 within the second space SP2. The stage 9 can be arranged within the radiation range of the X-ray XL emitted from the emission portion 8.

The detector 4 has scintillator portions 34 having an X-ray receiving surface 33 which is an incidence surface on which the X-ray XL is incident, the X-ray XL coming from the X-ray source 1 and including the transmission X-ray transmitted through the measuring object S; and light receiving portions 35 respectively receiving light rays generated in the scintillator portions 34. The X-ray receiving surface 33 of the detector 4 can face the measuring object S retained on the stage 9.

Each of the scintillator portions 34 includes a scintillation substance which generates a light with a different wavelength from that X-ray, by exposing itself to an X-ray. Each of the light receiving portions 35 includes a photomultiplier tube. The photomultiplier tube includes a phototube converting optical energy into electrical energy by photoelectric effect. The light receiving portions 35 amplify a weak electrical signal arising from the light generated in the scintillator portions 34. That is, the light receiving portions 35 convert the light generated in the scintillator portions 34 into an electrical signal and output the same.

The detector 4 has a plurality of the scintillator portions 34. The plurality of scintillator portions 34 are arranged in the X-Y plane. The scintillator portions 34 are arranged in an array-like form. The detector 4 has a plurality of the light receiving portions 35 to connect respectively with the plurality of scintillator portions 34. Further, it is also possible for the detector 4 to directly convert the incident X-ray into the electrical signal without converting the incident X-ray into the light. In other words, the detector 4 is not necessarily limited to using a scintillation detector having the scintillator portions 34, but can use other types of X-ray detector. For example, it is also possible to use detectors directly converting the incident X-ray into the electrical signal without converting the incident X-ray into the light: for example, semiconductor detectors such as silicon detectors and the like, gas detectors such as ionization chambers and the like, etc.

The supply port 7 supplies the temperature-controlled gas G to at least part of the X-ray source 2. In the first embodiment, the adjusting system 360 includes an adjusting device 36 controlling or adjusting the temperature of the gas G. The adjusting device 36 operates on, for example, electric power. The supply port 7 supplies the internal space SP (the first space SP1) with the gas G from the adjusting device 36.

In the first embodiment, the adjusting device 36 is arranged in the external space RP of the chamber member 6. In the first embodiment, the adjusting device 36 is arranged on the support surface FR. The adjusting device 36 is connected with a duct 37. The duct 37 is also arranged in the external space RP. The adjusting device 36 is separate from the chamber member 6. At least part of the duct 37 is also separate from the chamber member 6.

The chamber member 6 has a duct 38. The duct 38 is formed to link the internal space SP and the external space RP. The opening at one end of the duct 38 is arranged to face with the external space RP. The opening at the other end of the duct 38 is arranged to face with the internal space SP. The flow passage of the duct 37 is connected with the opening at the one end of the duct 38. In the first embodiment, the opening at the other end of the duct 38 functions as the supply port 7.

In the first embodiment, the adjusting device 36 takes in some gas in the external space RP, for example, to adjust or regulate the temperature of the gas. The gas G temperature-controlled by the adjusting device 36 is sent to the supply port 7 via the flow passage of the duct 37, and the duct 38 of the chamber member 6. The supply port 7 is arranged to face at least part of the X-ray source 2. The supply port 7 supplies at least part of the X-ray source 2 with the gas G from the adjusting device 36. The adjusting device 36 supplies at least part of the X-ray source 2 with the gas G from the adjusting device 36 via the supply port 7. The adjusting device 36 can integrally include the duct 37 and the duct 38 or, otherwise, the duct 37 and the duct 38 can at least partially be different members from each other.

Figure 2:
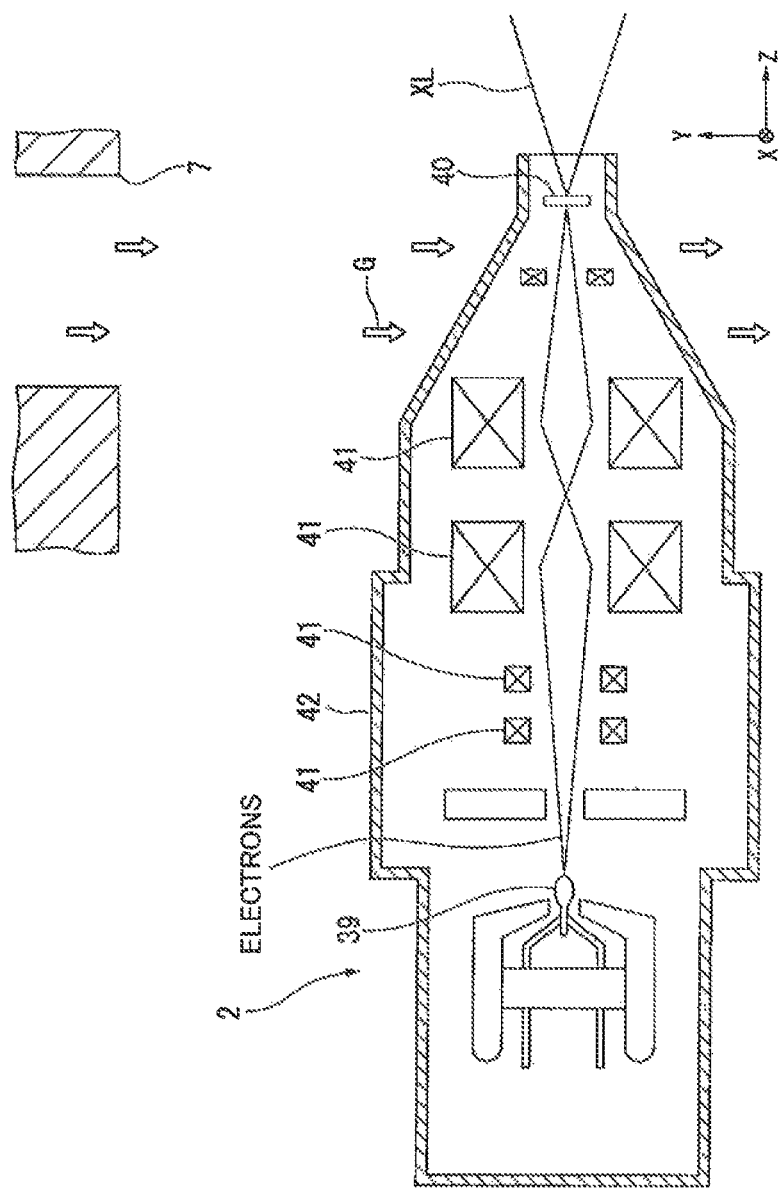
FIG. 2 is a view showing an example of an X-ray source in accordance with the first embodiment.

FIG. 2 is a cross-sectional view showing an example of the X-ray source 2 in accordance with the first embodiment. In FIG. 2, the X-ray source 2 includes a filament 39 generating electrons, a target 40 generating an X-ray by collision of the electrons or transmission of the electrons, and electron conduction members 41 conducting the electrons to the target 40. Further, in the first embodiment, the X-ray source 2 includes a housing 42 accommodating at least parts of the electron conduction members 41. In the first embodiment, the housing 42 accommodates each of the filament 39, electron conduction members 41, and target 40.

The filament 39 contains, for example, tungsten. When an electric current flows through the filament 39 and the filament 39 is heated by that electric current, then electrons (thermoelectrons) are emitted from the filament 39. The filament 39 is shaped with a pointed apical end, from which the electrons are easy to be emitted. The filament 39 is shaped as has been wound into a coil. Further, the supply source of the electrons (thermoelectrons) in the X-ray source 2 is not necessarily limited to a filament. For example, it is also possible to use an electron gun.

The target 40 contains tungsten, for example, to generate the X-ray by collision of the electrons or transmission of the electrons. In the first embodiment, the X-ray source 2 is of a so-called transmission type. In the first embodiment, the target 40 generates the X-ray by transmission of the electrons.

For example, with the target 40 as the anode and the filament 39 as the cathode, when a voltage is applied between the target 40 and the filament 39, then the thermoelectrons emitted from the filament 39 will accelerate toward the target 40 (the anode) to irradiate the target 40. By virtue of this, the X-ray is generated from the target 40.

The electron conduction members 41 are arranged in at least some parts surrounding the pathway of the electrons from the filament 39 between the filament 39 and the target 40. Each of the electron conduction members 41 includes, for example, either electron lenses such as a focusing lens, an object lens and the like or a polariscope to conduct the electrons from the filament 39 to the target 40. The electron conduction members 41 cause the electrons to collide against a partial area of the target 40 (focal point of the X-ray). The dimension of the area (the spot size) in the target 40 against which the electrons collide is sufficiently small. By virtue of this, a substantial point X-ray source is formed.

In the first embodiment, the temperature-controlled gas G is supplied from the supply port 7 to the external surface of the housing 42. In the first embodiment, the supply port 7 faces at least part of the external surface of the housing 42. In the first embodiment, the supply port 7 is arranged above (on the +Y side from) the X-ray source 2 (the housing 42). The supply port 7 causes the gas G to blow from above the X-ray source 2 onto the external surface of the housing 42 of the X-ray source 2.

In the X-ray source 2, when the target 40 is irradiated with the electrons, then some of the energy of the electrons becomes an X-ray whereas some of the energy becomes heat. Irradiating the target 40 with the electrons causes an increase in the temperatures of the target 40, the space surrounding the target 40, and the members arranged in the vicinity of the target 40.

When the temperature of the target 40 increases, then it is possible that, for example, the target 40 and/or the housing 42 can undergo thermal distortion, and/or the relative position between the filament 39 and the target 40 can undergo a change. Further, when the temperature of the X-ray source 2 including the target 40 increases, then it is possible to bring about a temperature change in the first space SP1 where the X-ray source 2 is placed. Further, when the temperature of the X-ray source 2 including the target 40 increases, then it is possible that, for example, at least some of the members of the detection apparatus 1 aside from the X-ray source 2 can undergo thermal distortion. Further, when the temperature of the X-ray source 2 including the target 40 increases, then it is possible that, for example, at least part of the stage device 3 including the stage 9 and the drive system 10 can undergo distortion, and/or the guide member 26 and/or the detector 4 can undergo thermal distortion. Further, when the temperature of the X-ray source 2 increases, then it is possible that the relative position between the X-ray source 2 and the stage 9 can undergo a change, the relative position between the X-ray source 2 and the detector 4 can undergo a change, and/or the relative position between the stage 9 and the detector 4 can undergo a change. In this manner, when the temperature of the X-ray source 2 changes, then it is possible that at least some of the members of the detection apparatus 1 can undergo thermal distortion, and/or relative position between some of the members can undergo a change. As a result, it is possible to decrease the detection accuracy (inspection accuracy and/or measurement accuracy) of the detection apparatus 1.

In the first embodiment, the partitionment portion 100 divides the first space SP1 where the X-ray source 2 producing heat is placed from the second space SP2 where the stage device 3 and detector 4 are placed. The partitionment portion 100 suppresses or prevents the communication of fluid (gas or liquid or both) from the first space SP1 to the second space SP2. Further, the partitionment portion 100 also prevents the communication of fluid from the second space SP2 to the first space SP1. The partitionment portion 100 prevents the gas in the first space SP1, for example, from moving into the second space SP2. Further, the partitionment portion 100 suppresses or prevents the gas in the second space SP2, for example, from moving into the first space SP1. Therefore, for example even when temperature differs between the first space SP1 and the second space SP2 due to the heat produced by the X-ray source 2, because the gas in the first space SP1 is suppressed or prevented from moving into the second space SP2, the second space SP2 is still suppressed from any temperature change due to mixture of the gas in the first space SP1 with the gas in the second space SP2. Thus, for example even when the heat produced by the X-ray source 2 causes an increase in the temperature of the gas in the first space SP1, the gas in the first space SP1 is suppressed from moving into the second space SP2. That is, the partitionment portion 100 suppresses or prevents the movement of the gas from the first space SP1 into the second space SP2, and thus suppresses or prevents the temperature change of the second space SP2. Therefore, it is possible to suppress or prevent thermal distortion in at least some of the members of the detection apparatus 1 which are placed in the second space SP2 such as the stage device 3, detector 4 and the like, and suppress a change in relative position between some of the members.

Further, in the first embodiment, because the adjusting system 360 is provided to control the temperature of the first space SP1 where the X-ray source 2 producing heat is placed, adjustment is made for the temperature of the members of the detection apparatus 1 placed in the first space SP1 including the X-ray source 2. By virtue of this, it is possible to suppress thermal distortion in at least some of the members placed in the first space SP1 including the X-ray source 2, suppress a temperature change in the first space SP1, and suppress a change in relative position between the members placed in the internal space SP.

Further, in the first embodiment, the adjusting system 360 can concentrically control the temperature of the first space SP1 where the X-ray source 2 producing heat is placed, thereby enabling suppression of energy use (for example, the amount of electricity used by the adjusting device 36). That is, as compared with a case of adjusting the temperature of the entire internal space SP including the first and second spaces SP1 and SP2, using the adjusting system 360 enables suppression of the energy use of the adjusting system 360. In this manner in the first embodiment, by adjusting the temperature of a partial space of the internal space SP, it is possible to suppress thermal distortion in the members, and suppress a change in relative position between the members, etc.

Further, in the first embodiment, although the supply port 7 is contrived to supply the temperature-controlled gas G to the X-ray source 2, it is also possible to supply the temperature-controlled gas G to another member than the X-ray source 2 placed in the first space SP1.

Next, an example of operation of the detection apparatus in accordance with the first embodiment will be explained.

Figure 3:
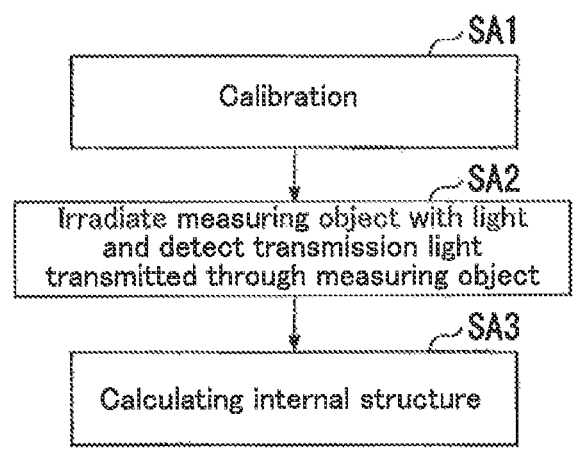
FIG. 3 is a flowchart for explaining an example of operation of the detection apparatus in accordance with the first embodiment.

In the first embodiment, as shown in the flowchart of FIG. 3, such steps are carried out as: calibrating the detection apparatus 1 (step SA1), irradiating the measuring object S with the X-ray XL and detecting the transmission X-ray transmitted through the measuring object S (step SA2), and calculating the internal structure of the measuring object S (step SA3).

Figure 4:
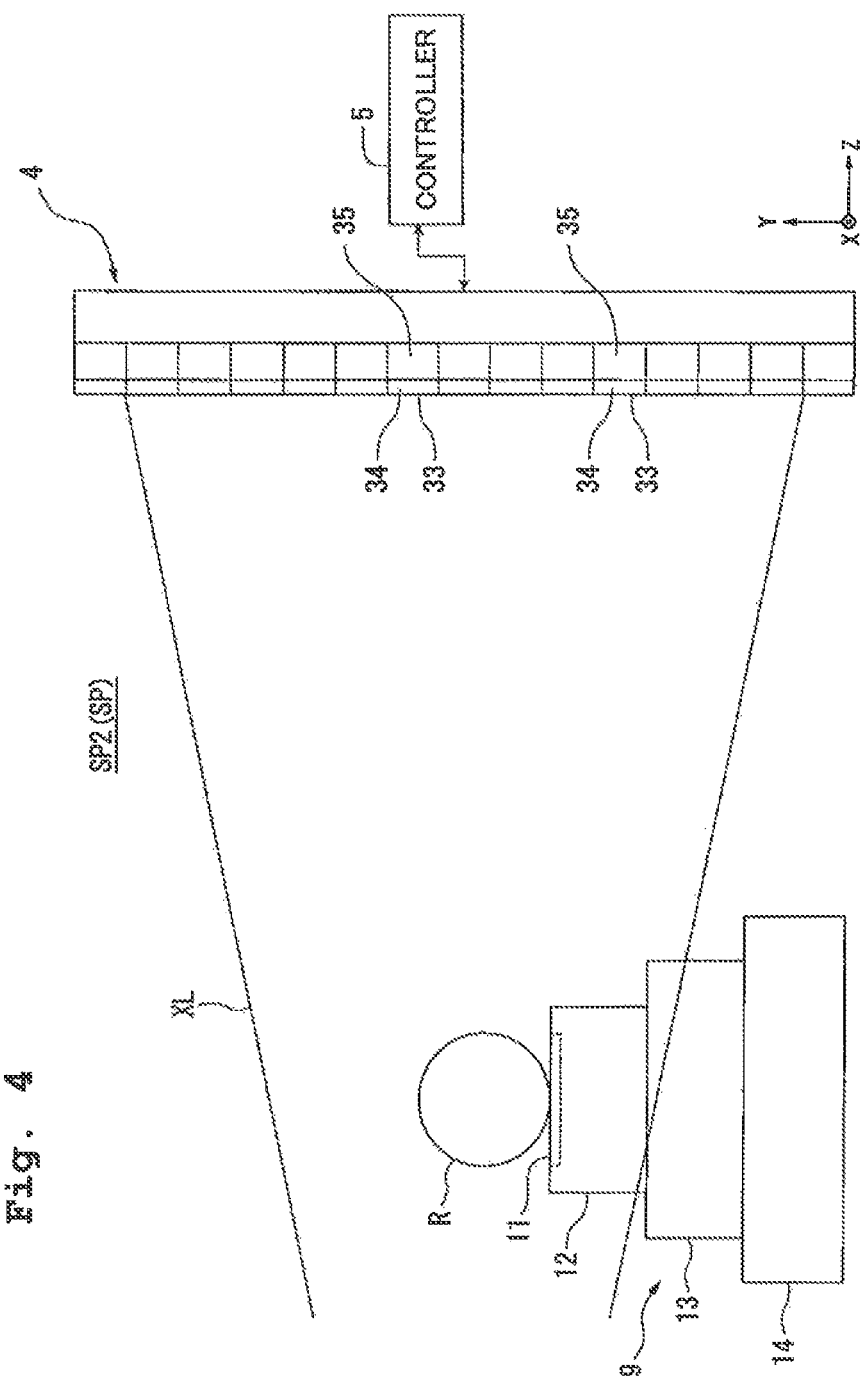
FIG. 4 is a view for explaining the example of operation of the detection apparatus in accordance with the first embodiment.

First, the calibrating (step SA1) will be explained. FIG. 4 is a schematic view showing an example of calibration in accordance with the first embodiment. As shown in FIG. 4, in the calibration, a reference member R different from the measuring object S is retained on the table 12. Further, in the calibration, the temperature-controlled gas G is supplied from the supply port 7 to the first space SP1. By supplying the temperature-controlled gas G from the supply port 7 to the first space SP1, the temperature of the first space SP1 including the X-ray source 2 is controlled with the gas G. Further, when at least part of the temperature-controlled gas G from the supply port 7 flows into the second space SP2 via the passage portion 101, then the temperature of the second space SP2 is also controlled. Further, even when there is no at least part of the temperature-controlled gas G flowing into the second space SP2 from the supply port 7, the partitionment portion 100 still serves to suppress a change in the temperature of the second space SP2.

In the following explanation, a predetermined temperature Ta is used as appropriate to refer to the temperature of the internal space SP including the X-ray source 2, which has been controlled with the gas G supplied from the supply port 7.

In the first embodiment as shown in FIG. 4, the reference member R is a spherical object. The profile (dimension) of the reference member R is known. The reference member R is an object suppressed from thermal distortion. The reference member R is an object which is suppressed from thermal distortion at least to a greater extent than the measuring object S is suppressed. Even when temperature changes in the internal space SP, the profile (dimension) of the reference member R virtually does not change. Further, in the first embodiment, the reference member R is not limited to a spherical shape.

The control device 5 measures the position of the stage 9 with the measuring system 28 while controlling the drive system 10 to adjust the position of the stage 9 retaining the reference member R. The control device 5 adjusts the position of the stage 9 such that the reference member R can be disposed in a reference position Pr.

Along with at least part of the supply of the gas G from the supply port 7, the control device 5 causes an electric current to flow through the filament 39 for emitting an X-ray from the X-ray source 2. By virtue of this, the filament 39 is heated, and thereby electrons are emitted from the filament 39. The target 40 is then irradiated with the electrons emitted from the filament 39. By virtue of this, an X-ray is generated from the target 40.

The reference member R is irradiated with at least part of the X-ray XL generated from the X-ray source 2. At the predetermined temperature Ta, when the reference member R is irradiated with the X-ray XL from the X-ray source 2, then at least part of the X-ray XL irradiating the reference member R is transmitted through the reference member R. The transmission X-ray transmitted through the reference member R is then incident on the X-ray receiving surface 33 of the detector 4. The detector 4 detects the transmission X-ray transmitted through the reference member R. At the predetermined temperature Ta, the detector 4 detects an image of the reference member R obtained based on the transmission X-ray transmitted through the reference member R. In the first embodiment, the dimension (size) of the image of the reference member R obtained at the predetermined temperature Ta is referred to as a dimension Wa. The detection result of the detector 4 is outputted to the control device 5.

Based on the dimension of the image of the reference member R and the dimension of the reference member R, the control device 5 calculates the relative positions between the X-ray source 2, the reference member R and the detector 4. Further, although one spherical object is used in the first embodiment, it is also possible to use a plurality of spherical objects. When a plurality of spherical objects are used, then the positions of the spherical objects can differ from each other, for example, in one or both of the Y-axis direction and the Z-axis direction. Further, when a plurality of spherical objects are used, then the relative positions between the X-ray source 2, the reference members R and the detector 4 can be calculated not based on the images of the reference members R but based on the distances between the respective reference members R. Further, the distances between the respective reference members R can be calculated either as the distances between the central positions of the respective reference members R or as the distances between predetermined profile positions of the respective reference members R.

In the first embodiment, a change in a temperature T of the internal space SP causes a change in the dimension (size) of the image obtained based on the transmission X-ray. Further, the dimension of the image obtained based on the transmission X-ray refers to the dimension of the image acquired by the detector 4, including, for example, the dimension of the image formed in the X-ray receiving surface 33.

For example, a change in the temperature T causes a change in the relative positions between the X-ray source 2, the reference member R, and the detector 4 (the relative positions with respect to the Z-axis direction). For example, when the internal space SP is at a reference temperature Tr (ideal temperature or target temperature), then a reference dimension Wr is used to refer to the dimension of the image acquired by the detector 4 based on the X-ray XL irradiating the reference member R disposed in the reference position Pr.

On the other hand, when the internal space SP is at a temperature TX different from the reference temperature Tr, then it is possible to give rise to thermal distortion in, for example, at least some of the X-ray source 2, stage 9, detector 4, base member 26 (scale member 32A) and chamber member 6, thereby changing the relative positions between the X-ray source 2, the reference member R retained on the stage 9, and the detector 4. As a result, for example, even though the position of the stage 9 is adjusted based on the measuring result of the measuring system 28 to dispose the reference member R in the reference position Pr, it is still possible for the reference member R not to be actually disposed in the reference position Pr. In other words, when the internal space SP is at the temperature TX, it is possible that the reference member R can be disposed in a position PX different from the reference position Pr. Further, the position PX includes the relative position of the reference member R with respect to at least one of the X-ray source 2 and the detector 4.

Further, when the internal space SP is at the temperature TX while there is a change in the relative positions between the X-ray source 2, the reference member R and the detector 4, then the image acquired by the detector 4 has a dimension WX different from the reference dimension Wr.

In the first embodiment, the control device 5 includes a storage device. The storage device stores a relationship between the temperature T of the internal space SP, and the dimension (size) of the image (picture) of the reference member R obtained based on the transmission X-ray transmitted through the reference member R out of the X-ray XL irradiating the reference member R at the temperature T.

Further, as described above, along with the change in the temperature T of the internal space SP, there is a change in the relative positions between the X-ray source 2, the reference member R, and the detector 4. Further, along with the change in the relative positions, there is a change in the dimension of the image acquired by the detector 4. The storage device also stores a relationship between the relative positions and the dimension of the image.

Further, the information stored in the storage device is obtained through at least one of a preliminary experiment and a simulation.

Therefore, the control device 5 can calculate the relative positions between the X-ray source 2, the reference member R and the detector 4 at the temperature T based on the information stored in the storage device, and the dimension of the image of the reference member R acquired by the detector 4.

For example, when the internal space SP is at the predetermined temperature Ta, the control device 5 can calculate the relative positions between the X-ray source 2, the reference member R and the detector 4 at the predetermined temperature Ta based on the information stored in the storage device, and the dimension Wa of the image the reference member R acquired by the detector 4.

Figure 5:
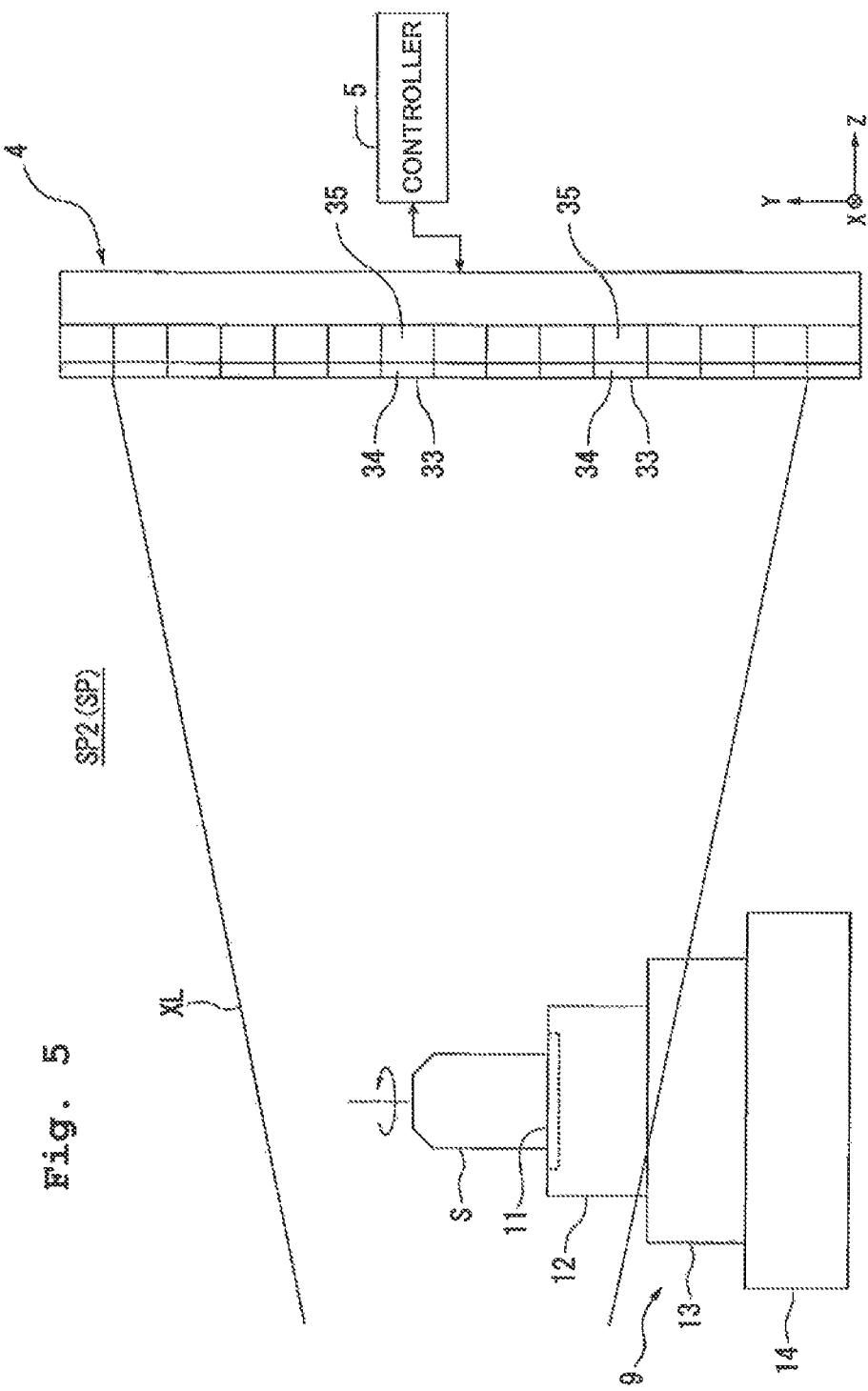
FIG. 5 is another view for explaining the example of operation of the detection apparatus in accordance with the first embodiment.

After the calibration is finished, detecting the measuring object S is carried out (step SA2). FIG. 5 is a schematic view showing an example of the detecting in accordance with the first embodiment. As shown in FIG. 5, in the detection, the measuring object S is retained on the table 12. The control device 5 controls the stage device 3 to dispose the measuring object S between the X-ray source 2 and the detector 4.

Further, in the detection, the temperature-controlled gas G is supplied from the supply port 7 to the first space SP1. By supplying the temperature-controlled gas G from the supply port 7 to the first space SP1, the temperature of the first space SP1 including the X-ray source 2 is controlled with that gas G. Further, when at least part of the temperature-controlled gas G from the supply port 7 flows into the second space SP2 via the passage portion 101, then the temperature of the second space SP2 is also controlled. Further, even when there is no at least part of the temperature-controlled gas G flowing into the second space SP2 from the supply port 7, the partitionment portion 100 still serves to suppress a change in the temperature of the second space SP2.

The control device 5 causes the temperature-controlled gas G to be supplied from the supply port 7 to the first space SP1 including the X-ray source 2 such that the internal space SP can be at the predetermined temperature Ta.

The control device 5 measures the position of the stage 9 with the measuring system 28 while controlling the drive system 10 to adjust the position of the stage 9 retaining the measuring object S.

Along with at least part of the supply of the gas G from the supply port 7, the control device 5 causes an electric current to flow through the filament 39 for emitting an X-ray from the X-ray source 2. By virtue of this, the filament 39 is heated, and thereby electrons are emitted from the filament 39. The target 40 is then irradiated with the electrons emitted from the filament 39 and accelerated by the electrical field. By virtue of this, an X-ray is generated from the target 40.

The measuring object S is irradiated with at least part of the X-ray XL generated from the X-ray source 2. At the predetermined temperature Ta, when the measuring object S is irradiated with the X-ray XL from the X-ray source 2, then at least part of the X-ray XL irradiating the measuring object S is transmitted through the measuring object S. The transmission X-ray transmitted through the measuring object S is then incident on the X-ray receiving surface 33 of the detector 4. The detector 4 detects the transmission X-ray transmitted through the measuring object S. At the predetermined temperature Ta, the detector 4 detects an image of the measuring object S obtained based on the transmission X-ray transmitted through the measuring object S. In the first embodiment, the dimension (size) of the image of the measuring object S obtained at the predetermined temperature Ta is referred to as a dimension Ws. The detection result of the detector 4 is outputted to the control device 5.

In the first embodiment, the control device 5 uses the calibration result to correct the detection result of the transmission X-ray transmitted through the measuring object S out of the X-ray XL irradiating the measuring object S at the predetermined temperature Ta.

For example, the control device 5 corrects the image of the measuring object S obtained at the predetermined temperature Ta such that the image of the measuring object S obtained at the predetermined temperature Ta can coincide with the image obtained at the reference temperature Tr.

For example, in the case of the dimension Ws of the image of the measuring object S obtained at the predetermined temperature Ta, the control device 5 multiplies the dimension Ws by a correction value Wr/Wa. That is, the control device 5 carries out the operation Ws×(Wr/Wa). By virtue of this, even when the actual temperature of the internal space SP is the predetermined temperature Ta, the control device 5 can still calculate the image (image dimension) of the measuring object S at the reference temperature Tr.

In the first embodiment, in order to change the area of irradiating the measuring object S with the X-ray XL from the X-ray source 2, the control device 5 causes the X-ray XL from the X-ray source 2 to irradiate the measuring object S while changing the position of the measuring object S. That is, the control device 5 causes the X-ray XL from the X-ray source 2 to irradiate the measuring object S at each of a plurality of positions of the measuring object S, and lets the detector 4 detect the transmission X-ray transmitted through the measuring object S.

In the first embodiment, the control device 5 changes the area of irradiating the measuring object S with the X-ray XL from the X-ray source 2 by rotating the table 12 retaining the measuring object S to change the position of the measuring object S relative to the X-ray source 2.

That is, in the first embodiment, the control device 5 causes the X-ray XL to irradiate the measuring object S while rotating the table 12 retaining the measuring object S. The detector 4 detects the transmission X-ray (X-ray transmission data) transmitted through the measuring object S at each position (each rotation angle) of the table 12. The detector 4 acquires an image of the measuring object S at each position.

The control device 5 calculates the internal structure of the measuring object from the detection result of the detector 4 (step SA3). In the first embodiment, the control device 5 acquires an image of the measuring object S based on the transmission X-ray (X-ray transmission data) transmitted through the measuring object S at each of the respective positions (each rotation angle) of the measuring object S. That is, the control device 5 acquires a plurality of images of the measuring object S.

The control device S carries out a calculational operation based on the plurality of X-ray transmission data (images) obtained by irradiating the measuring object S with the X-ray XL while rotating the measuring object S, so as to reconstruct a tomographic image of the measuring object S and acquire a three-dimensional data (three-dimensional structure) of the internal structure of the measuring object S. By virtue of this, the internal structure of the measuring object S is calculated. As a method for reconstructing a tomographic image of the measuring object, for example, the back projection method, the filtered back projection method, or the successive approximation method can be adopted. With respect to the back projection method and the filtered back projection method, descriptions are given in, for example, U.S. Patent Application Publication No. 2002/0154728. Further, with respect to the successive approximation method, a description is given in, for example, U.S. Patent Application Publication No. 2010/0220908.

As explained above, according to the first embodiment, because the partitionment portion 100 is provided, even when the first space SP1 undergoes a temperature change, it is still possible to suppress the second space SP2 from temperature change. Further, in the first embodiment, because it is attempted to control the temperature of the first space SP1, it is also possible to suppress the first space SP1 from temperature change while suppressing energy use.

Therefore, it is possible to suppress thermal distortion in at least some of the members placed in the internal space SP including the first and second spaces SP1 and SP2, and suppress a change in relative position between the members.

Therefore, it is possible to suppress a decrease in the detection accuracy of the detection apparatus 1. For example, the detection apparatus 1 can accurately acquire information about the internal structure of the measuring object S.

Further, in the first embodiment, it is also possible for the control device 5 to let the first space SP1 including the X-ray source 2 be supplied with the temperature-controlled gas G from the supply port 7 at least when the X-ray source 2 is emitting the X-ray XL. In other words, the control device 5 can let the first space SP1 be supplied with the temperature-controlled gas G at least when an electric current is flowing through the filament 39. By virtue of this, temperature change is suppressed from happening to the gas in the first space SP1, and at least some of the members placed in the first space SP1.

Further, it is also possible to supply the first space SP1 with the temperature-controlled gas G at least part of the period when the X-ray XL is not emitted from the X-ray source 2.

Further, in the first embodiment, it is contrived to change the area of irradiating the measuring object S with the X-ray XL to acquire a plurality of images of the measuring object S, and acquire a three-dimensional data of the internal structure of the measuring object S based on these plurality of images (pictures). However, it is also possible to acquire information about the internal structure of the measuring object S based on one image (picture).

Further, while the supply port 7 is arranged above (on the +Y side of) the X-ray source 2 in the first embodiment, it can alternatively be arranged on the +X or −X side of the X-ray source 2, or on the −Y side of the X-ray source 2. Further, the supply port 7 can include a plurality of supply ports 7 arranged to face the X-ray source 2. For example, the plurality of supply ports 7 can be arranged to encircle the housing 42.

Further, in the first embodiment, the supply port 7 can include a plurality of supply ports 7 arranged in the Z-axis direction.

Second Embodiment

Next, a second embodiment will be explained. In the following explanation, the same reference numerals will be assigned to the constitutive parts or components which are the same as or equivalent to those of the first embodiment described above, and the explanations therefor will be simplified or omitted.

Figure 6:
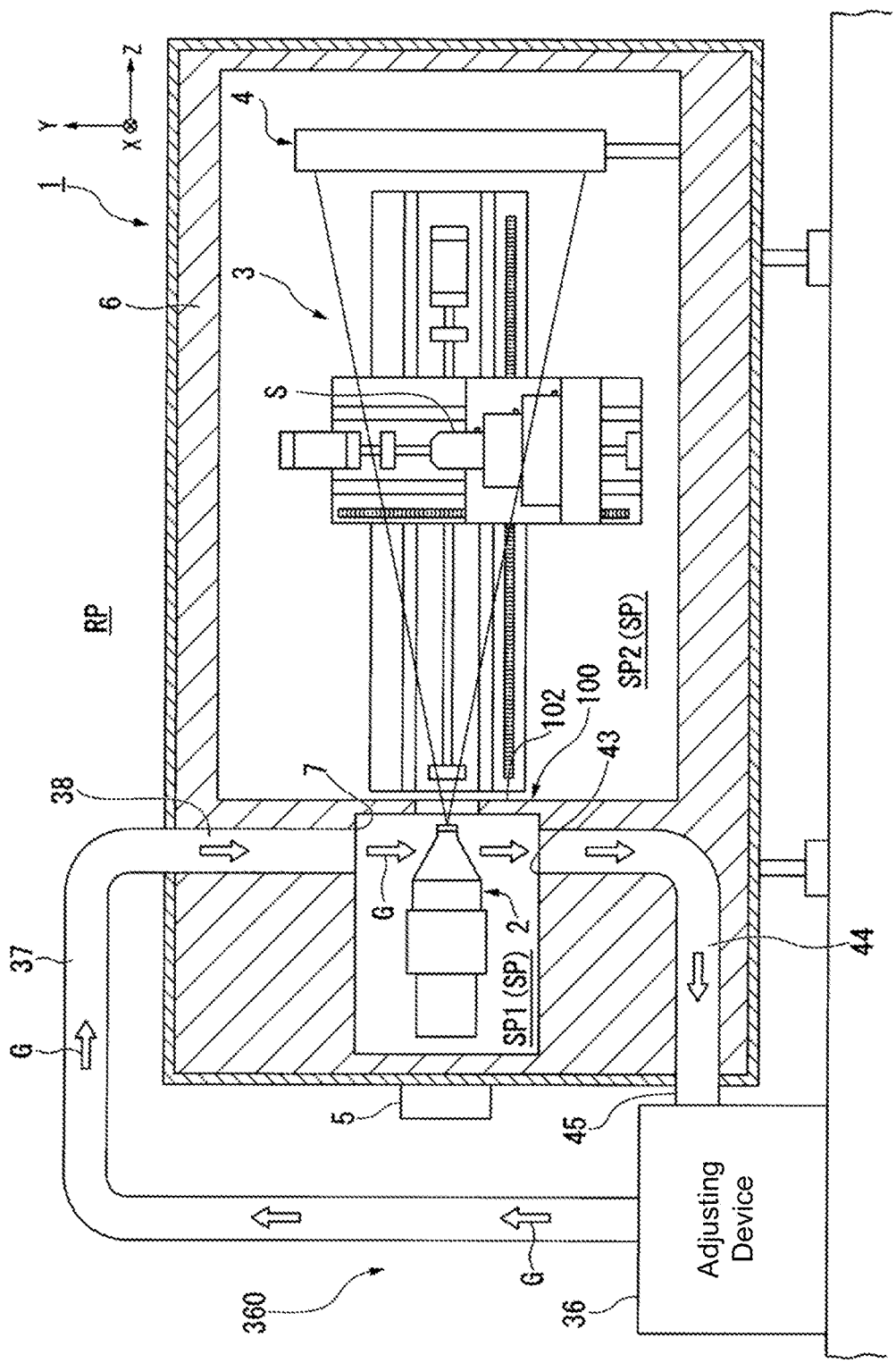
FIG. 6 is a view showing an example of a detection apparatus in accordance with a second embodiment.

FIG. 6 is a view showing an example of a detection apparatus 1 in accordance with the second embodiment. In FIG. 6, the adjusting system 360 includes the supply port 7 supplying the temperature-controlled gas G to the first space SP1, and a discharge port 43 discharging at least part of the gas in the first space SP1 from the first space SP1. In the second embodiment, the gas discharged from the discharge port 43 includes at least part of the gas G supplied from the supply port 7.

The chamber member 6 has a duct 44. The duct 44 is formed to link the first space SP1 and the external space RP. The opening at one end of the duct 44 is arranged to face with the first space SP1. The opening at the other end of the duct 44 is arranged to face with the external space RP. In the second embodiment, the opening at the one end of the duct 44 functions as the discharge port 43. At least part of the gas in the first space SP1 is discharged from the discharge port 43 and, after flowing through the duct 44, let out to the external space RP via the opening at the other end of the duct 44.

In the second embodiment, the opening at the other end of the duct 44 is connected with one end of a duct 45. The other end of the duct 45 is connected with the adjusting device 36. In the second embodiment, the gas discharged from the discharge port 43 is sent to the adjusting device 36 via the duct 44 of the chamber member 6, and the flow passage of the duct 45.

In the second embodiment, the adjusting device 36 adjusts the temperature of the gas discharged from the discharge port 43. The adjusting device 36 adjusts the temperature of the gas from the discharge port 43 and then sends the same to the supply port 7. The supply port 7 supplies at least part of the X-ray source 2 with the temperature-controlled gas G from the adjusting device 36.

In this manner, in the second embodiment, a circulation system circulating the gas is established by the adjusting device 36, the flow passage of the duct 37, the duct 38, the internal space SP, the duct 44, and the flow passage of the duct 45.

In the second embodiment, the discharge port 43 is arranged to face at least part of the X-ray source 2. In the second embodiment, the supply port 7 is arranged above (on the +Y side of) the X-ray source 2 while the discharge port 43 is arranged below (on the −Y side of) the X-ray source 2. The X-ray source 2 is arranged between the supply port 7 and the discharge port 43.

In the second embodiment, the adjusting device 36 includes a vacuum system capable of sucking gas. With the vacuum system of the adjusting device 36 in operation, the discharge port 43 sucks at least part of the gas in the first space SP1. That is, in the second embodiment, the adjusting device 36 including the vacuum system forcibly discharges at least part of the gas in the first space SP1 from the first space SP1 via the discharge port 43.

In the second embodiment, along with at least part of the supply of the gas G from the supply port 7, the adjusting device 36 discharges the gas from the discharge port 43. By virtue of this, in the first space SP1, a gas flow is generated from the supply port 7 toward the discharge port 43. The gas flow in the first space SP1 is formed up by discharging the gas from the discharge port 43 along with at least part of the supply of the gas G from the supply port 7.

Further, the gas can also be discharged (sucked) from the discharge port 43 when the supply of the gas G from the supply port 7 is stopped. Further, the gas G can also be supplied from the supply port 7 when the discharge (suction) of the gas from the discharge port 43 is stopped. For example, it is possible to alternately carry out a first operation to supply the gas G from the supply port 7 without sucking the gas from the discharge port 43, and a second operation to suck the gas from the discharge port 43 while the supply of the gas G from the supply port 7 is stopped.

As explained above, in the second embodiment, it is also possible to suppress temperature change in the members in the first space SP1 including the X-ray source 2, and suppress temperature change in the first space SP1 per se.

Further, in the second embodiment, the adjusting device 36 is contrived to include a vacuum system which enables the discharge port 43 to suck (forcibly discharge) the gas in the first space SP1. However, it is also possible for the adjusting device 36 not to include any vacuum system. For example, the gas in the first space SP1 can be discharged naturally from the discharge port 43.

Further, in the second embodiment, it is possible for the adjusting device 36 to control the temperature of the total gas from the discharge port 43 and send the same to the supply port 7.

Further, in the second embodiment, it is also possible for the adjusting device 36 to control the temperature of part of the gas from the discharge port 43, send the same to the supply port 7, and let out the rest of the gas to the external space RP. Further, it is also possible for the adjusting device 36 to let out the total gas from the discharge port 43 to the external space RP. In this case, the adjusting device 36 can take in some gas in the external space RP, for example, control the temperature of this gas, and send at least part of the temperature-controlled gas G to the supply port 7.

Further, in the second embodiment, although the gas discharged from the discharge port 43 is sent to the adjusting device 36, it can alternatively be let out to the external space RP but not be sent to the adjusting device 36.

Further, in the above first and second embodiments, although the adjusting device 36 is arranged in the external space RP, it is also possible for the whole or part of the adjusting device 36 to be arranged in the internal space SP. For example, the adjusting device 36 can take in some gas in the internal space SP, control the temperature of this gas, and send the temperature-controlled gas G to the supply port 7.

Further, while the supply port 7 is arranged above (on the +Y side of) the X-ray source 2 in the second embodiment, it can alternatively be arranged on the +X or −X side of the X-ray source 2, or on the −Y side of the X-ray source 2. Further, while the discharge port 43 is arranged below (on the −Y side of) the X-ray source 2 in the second embodiment, it can alternatively be arranged on the +X or −X side of the X-ray source 2, or on the +Y side of the X-ray source 2. Further, although the X-ray source 2 is arranged between the supply port 7 and the discharge port 43 in the second embodiment, the discharge port(s) 43 can be arranged on one or both of the +X side and the −X side of the X-ray source 2, for example, while the supply port 7 is arranged on the +Y side of the X-ray source 2. Further, the supply port 7 can include a plurality of supply ports 7 arranged to face the X-ray source 2. Further, the discharge port 43 can also include a plurality of discharge ports 43 arranged to face the X-ray source 2. For example, the plurality of supply ports 7 and/or the plurality of discharge ports 43 can be arranged to encircle the housing 42.

Further, in the second embodiment, the supply port 7 can include a plurality of supply ports 7 arranged in the Z-axis direction, and the discharge port 43 can also include a plurality of discharge ports 43 arranged in the Z-axis direction.

Third Embodiment

Next, a third embodiment will be explained. In the following explanation, the same reference numerals will be assigned to the constitutive parts or components which are the same as or equivalent to those of the embodiments described above, and the explanations therefor will be simplified or omitted.

Figure 7:
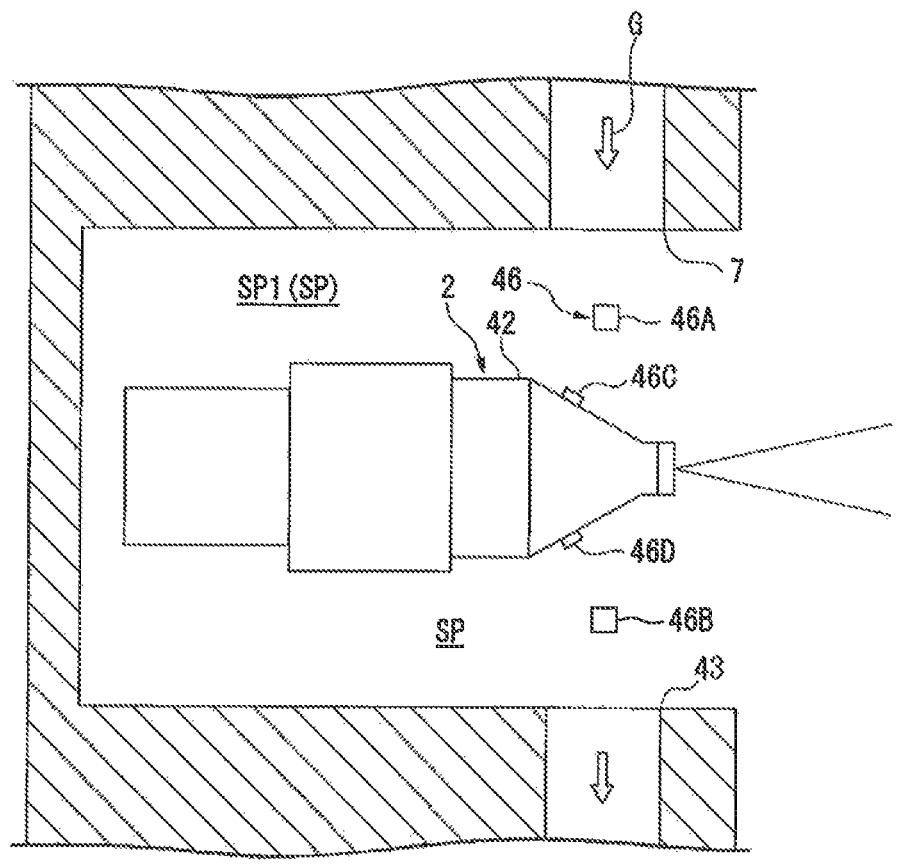
FIG. 7 is a view showing an example of a detection apparatus in accordance with a third embodiment.

FIG. 7 is a view showing part of a detection apparatus 1 in accordance with the third embodiment. Further, in the following explanation, such a case is taken as an example that the supply port 7 is arranged on the +Y side of the X-ray source 2 while the discharge port 43 is arranged on the −Y side of the X-ray source 2. As described above, however, it is possible to arbitrarily determine the number and position of the supply port(s) 7 and the discharge port(s) 43. Further, it is also possible to leave out the discharge port 43.

In FIG. 7, the detection apparatus 1 includes a temperature sensor 46 detecting the temperature(s) of at least one of the first space SP1 and a member placed in the first space SP1. In the third embodiment, the temperature sensor 46 detects the temperatures of the first space SP1 and the X-ray source 2 placed in the first space SP1. Further, the temperature sensor 46 can alternatively detect the temperature of another member placed in the first space SP1 than the X-ray source 2.

In the third embodiment, the temperature sensor 46 includes temperature sensors 46A, 46B, 46C, and 46D. The temperature sensor 46A is arranged between the supply port 7 and the X-ray source 2. The temperature sensor 46A is situated away from both the supply port 7 and the X-ray source 2. The temperature sensor 46B is arranged between the discharge port 43 and the X-ray source 2. The temperature sensor 46B is situated away from both the discharge port 43 and the X-ray source 2. The temperature sensor 46C is connected on the external surface of the housing 42 of the X-ray source 2. The temperature sensor 46C is arranged to face the supply port 7. The temperature sensor 46D is also connected on the external surface of the housing 42 of the X-ray source 2. The temperature sensor 46D is arranged to face the discharge port 43.

The temperature sensors 46A and 46B can detect the temperature of the first space SP1. The temperature sensor 46A can detect the temperature of the space between the supply port 7 and the X-ray source 2. The temperature sensor 46B can detect the temperature of the space between the discharge port 43 and the X-ray source 2. The temperature sensors 46C and 46D can detect the temperature of the X-ray source 2.

In the third embodiment, the temperature sensors 46A to 46D detect the temperatures in the calibration (step SA1 of FIG. 3). Further, in the third embodiment, the temperature sensors 46A to 46D detect the temperatures in irradiating the measuring object S with the X-ray XL and detecting the transmission X-ray transmitted through the measuring object S (step SA2 of FIG. 3). In other words, the temperature sensors 46A to 46D detect the temperature of at least one of the X-ray source 2 and the first space SP1 at least when the X-ray source 2 is emitting the X-ray XL.

The detection results of the temperature sensors 46A to 46D are outputted to the control device 5. In the third embodiment, the control device 5 controls the adjusting system 360 based on the detection results of the temperature sensors 46A to 46D. The adjusting system 360 adjusts the temperature of the first space SP1 based on the detection results of the temperature sensors 46A to 46D.

In the third embodiment, the control device 5 controls at least the operation of the adjusting device 36 based on the detection results of the temperature sensors 46A to 46D. The adjusting device 36 adjusts the temperature of the gas G supplied from the adjusting device 36 based on the detection results of the temperature sensors 46A to 46D. The control device 5 controls the regulating device 36 to control the temperature of the gas G sent out from the adjusting device 36 based on the detection results of the temperature sensors 46A to 46D such that the temperature of at least one of the X-ray source 2 and the first space SP1 can coincide with a target temperature. In other words, the control device 5 controls the regulating device 36 to regulate the temperature of the gas G sent out from the adjusting device 36 based on the detection results of the temperature sensors 46A to 46D to diminish the difference between the detection values of the temperature sensors 46A to 46D, and the target value of the temperature of at least one of the X-ray source 2 and the first space SP1.

As explained above, in the third embodiment, it is also possible to suppress temperature change in the members in the first space SP1 including the X-ray source 2, and suppress temperature change in the first space SP1 per se.

Fourth Embodiment

Next, a fourth embodiment will be explained. In the following explanation, the same reference numerals will be assigned to the constitutive parts or components which are the same as or equivalent to those of the embodiments described above, the explanations therefor will be simplified or omitted.

Figure 8:
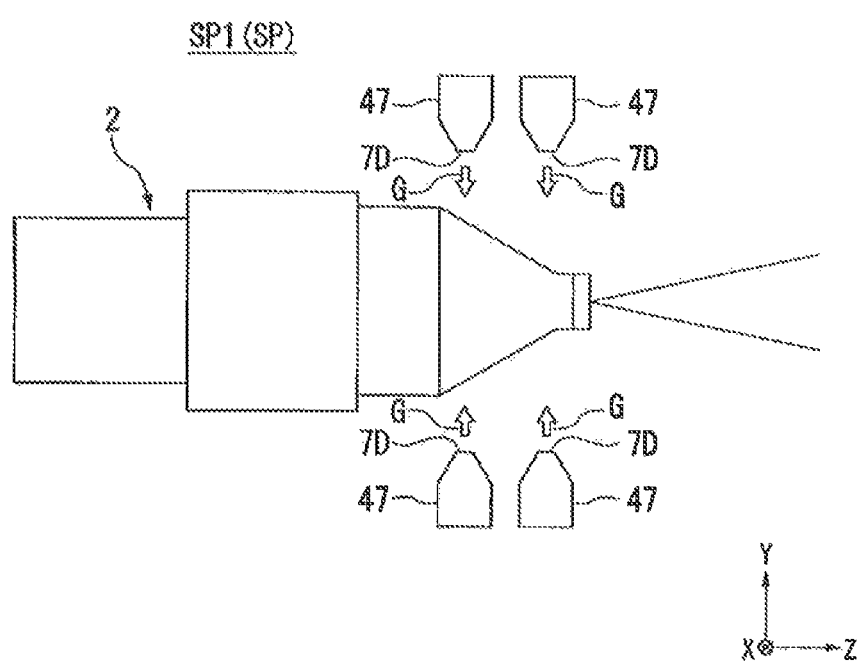
FIG. 8 is a view showing an example of a detection apparatus in accordance with a fourth embodiment.

FIG. 8 is a view showing part of a detection apparatus 1 in accordance with the fourth embodiment. In the fourth embodiment, the detection apparatus 1 includes a plurality of nozzle members 47 with supply ports 7D arranged in the first space SP1. In the fourth embodiment, the detection apparatus 1 has four nozzle members 47. Each of the nozzle members 47 has a supply port 7D.

The supply ports 7D of the nozzle members 47 supply the temperature-controlled gas G to at least part of the X-ray source 2. The nozzle members 47 are arranged in at least some parts surrounding the X-ray source 2. The nozzle members 47 are arranged such that the supply ports 7D can face the external surface of the housing 42.

In the fourth embodiment, the nozzle members 47 are movable relative to the X-ray source 2. The detection apparatus 1 has a drive system capable of moving the nozzle members 47. The control device 5 can control the drive system to move the nozzle members 47 relative to the X-ray source 2. The control device 5 can move the nozzle members 47 to supply the gas G from the supply ports 7D to any area of the external surface of the housing 42.

As explained above, in the fourth embodiment, it is also possible to suppress temperature change in the members in the first space SP1 including the X-ray source 2, and suppress temperature change in the first space SP1 per se.

Further, in the fourth embodiment, an arbitrary number of the nozzle members 47 (the supply ports 7D) can be provided: the number of nozzle members 47 (the supply ports 7D) can also be one, two, three, or more than four.

Further, in the fourth embodiment, it is also possible to provide a temperature sensor detecting the temperature of at least one of the X-ray source 2 and the first space SP1 for adjusting the temperature of the gas G supplied from the supply ports 7D based on the detection result of that temperature sensor.

Fifth Embodiment

Next, a fifth embodiment will be explained. In the following explanation, the same reference numerals will be assigned to the constitutive parts or components which are the same as or equivalent to those of the embodiments described above, and the explanations therefor will be simplified or omitted.

Figure 9:
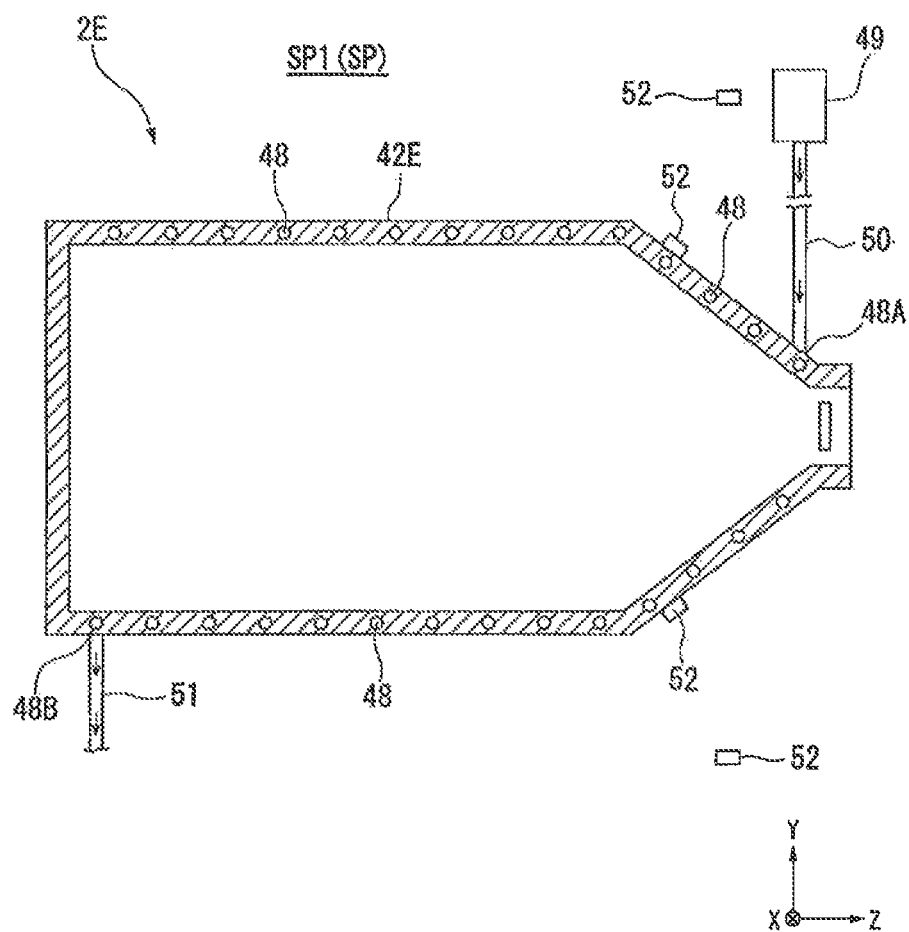
FIG. 9 is a view showing an example of a detection apparatus in accordance with a fifth embodiment.

FIG. 9 is a view showing part of an X-ray source 2E in accordance with the fifth embodiment. In the fifth embodiment, the X-ray source 2E has a housing 42E. The housing 42E has a duct 48.

In the fifth embodiment, the detection apparatus 1 has an adjusting device 49 supplying a temperature-controlled fluid to the duct 48 of the housing 42E. The adjusting device 49 can supply, for example, a temperature-controlled liquid, or a temperature-controlled gas or aerosol.

The duct 48 is formed into a spiral shape. The duct 48 has an inlet 48A and an outlet 48B. The adjusting device 49 is connected to the inlet 48A via a duct 50. The fluid is sent out from the adjusting device 49 to the inlet 48A via the flow passage of the duct 50. The fluid sent from the adjusting device 49 to the inlet 48A flows through the duct 48. The fluid flowing through the duct 48 flows out from the outlet 48B.

The outlet 48B is connected with a duct 51. The fluid out of the outlet 48B flows through the flow passage of the duct 51. The fluid out of the outlet 48B can be discharged to, for example, the external space RP. Further, the fluid out of the outlet 48B can be sent back to the adjusting device 49. Then, the adjusting device 49 can control the temperature of the fluid discharged from the outlet 48B. Further, the adjusting device 49 can send, again to the duct 48, the fluid discharged from the outlet 48B and temperature-controlled by the adjusting device 49.

Further, in the fifth embodiment, it is possible to provide a temperature sensor 52 detecting the temperature of at least one of the X-ray source 2E and the first space SP1. The adjusting device 49 can control the temperature of the fluid supplied to the duct 48 based on the detection result of that temperature sensor 52.

As explained above, in the fifth embodiment, it is also possible to suppress temperature change in the members in the first space SP1 including the X-ray source 2E, and suppress temperature change in the first space SP1 per se.

Sixth Embodiment

Next, a sixth embodiment will be explained. In the following explanation, the same reference numerals will be assigned to the constitutive parts or components which are the same as or equivalent to those of the embodiments described above, and the explanations therefor will be simplified or omitted.

Figure 10:
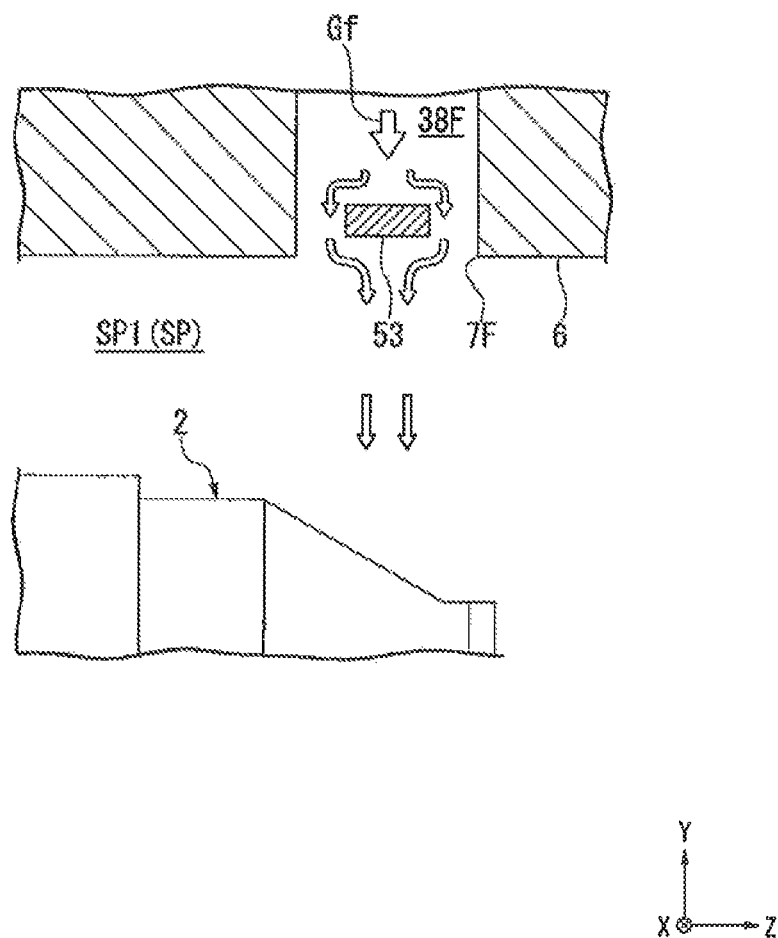
FIG. 10 is a view showing an example of a detection apparatus in accordance with a sixth embodiment.

FIG. 10 is a view showing an example of a detection apparatus 1 in accordance with the sixth embodiment. In FIG. 10, the detection apparatus 1 includes a duct 38F which is connected with a supply port 7F and through which a gas Gf flows to be supplied to the supply port 7F, and a temperature adjustment member 53 arranged in the duct 38F to be temperature-controlled. The duct 38F is formed in, for example, the chamber member 6. The supply port 7F includes the opening of one end of the duct 38F.

In the sixth embodiment, the gas Gf through contact with the temperature adjustment member 53 is supplied from the supply port 7F. By virtue of this, the gas Gf temperature-controlled by the temperature adjustment member 53 is supplied from the supply port 7F to at least part of the X-ray source 2.

The temperature adjustment member 53 includes, for example, a Peltier element. The Peltier element is controlled by the control device 5. The control device 5 controls the temperature adjustment member 53 including the Peltier element to supply the gas Gf at a target temperature from the supply port 7F.

As explained above, in the sixth embodiment, it is also possible to suppress temperature change in the members in the first space SP1 including the X-ray source 2, and suppress temperature change in the first space SP1 per se.

Further, in the sixth embodiment, it is also possible to provide a temperature sensor detecting the temperature of at least one of the X-ray source 2 and the first space SP1 for controlling the temperature adjustment member 53 based on the detection result of that temperature sensor.

Further, it is also possible to arrange the temperature adjustment member 53 in a flow passage formed in another member than the chamber member 6. For example, the temperature adjustment member 53 can be arranged in the flow passage of a nozzle member arranged in the first space SP1. It is possible to suppress temperature change in the X-ray source 2 and the like by supplying the gas through contact with the temperature adjustment member 53 to the X-ray source 2 from a supply port of the nozzle member.

Seventh Embodiment

Next, a seventh embodiment will be explained. In the following explanation, the same reference numerals will be assigned to the constitutive parts or components which are the same as or equivalent to those of the embodiments described above, and the explanations therefor will be simplified or omitted.

Figure 11:
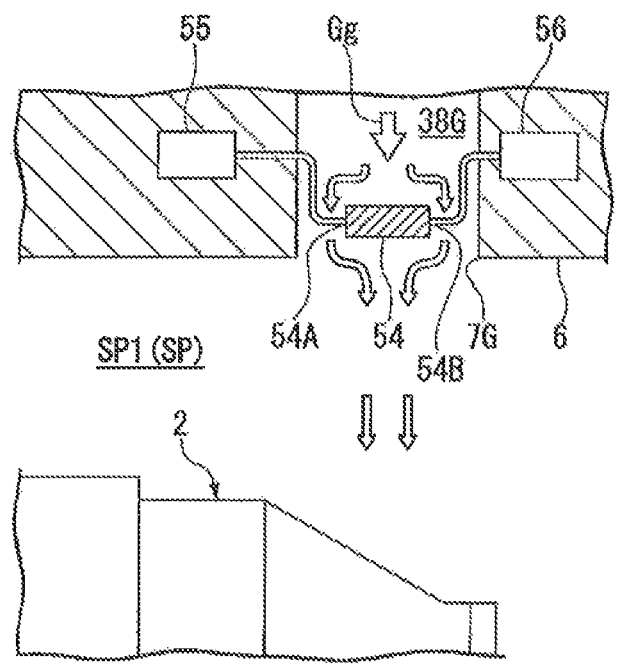
FIG. 11 is a view showing an example of a detection apparatus in accordance with a seventh embodiment.

FIG. 11 is a view showing an example of a detection apparatus 1 in accordance with the seventh embodiment. In FIG. 11, the detection apparatus 1 includes a duct 38G which is connected with a supply port 7G and through which a gas Gg flows to be supplied to the supply port 7G, and a temperature adjustment member 54 arranged in the duct 38G to be temperature-controlled. The duct 38G is formed in, for example, the chamber member 6. The supply port 7G includes the opening of one end of the duct 38G.

In the seventh embodiment, the gas Gg through contact with the temperature adjustment member 54 is supplied from the supply port 7G. By virtue of this, the gas Gg temperature-controlled by the temperature adjustment member 54 is supplied from the supply port 7G to at least part of the X-ray source 2.

In the seventh embodiment, the detection apparatus 1 has a supply device 55 supplying a temperature-controlled liquid to the temperature adjustment member 54. The supply device 55 operates on, for example, electric power. In the seventh embodiment, the temperature adjustment member 54 has a duct. The duct has an inlet 54A through which the liquid flows in, and an outlet 54B through which the liquid flows out. The temperature adjustment member 54 is made from, for example, a metal.

The supply device 55 is connected with the inlet 54A through another duct. The supply device 55 sends the temperature-controlled liquid to the inlet 54A via the flow passage of this duct. The liquid sent out from the supply device 55 and let through the inlet 54A flows through the duct of the temperature adjustment member 54. By virtue of this, the temperature adjustment member 54 is temperature-controlled with the liquid from the supply device 55.

In the seventh embodiment, the supply device 55 is controlled by the control device 5. The control device 5 controls the supply device 55 to supply the gas Gg at a target temperature from the supply port 7G.

In the seventh embodiment, the outlet 54B is connected with a recovery device 56 via still another duct. The liquid flowing through the duct of the temperature adjustment member 54 and out of the outlet 54B is recovered by the recovery device 56 via the flow passage of this duct.

In the seventh embodiment, the recovery device 56 can send the recovered liquid to the supply device 55. The supply device 55 can control the temperature of the liquid from the recovery device 56. Further, the supply device 55 can control the temperature of the liquid from the recovery device 56, and then supply the temperature-controlled liquid to the temperature adjustment member 54.

In the seventh embodiment, the supply device 55 and the recovery device 56 are arranged outside of the duct 38G. However, at least part of the supply device 55 can be arranged in the duct 38G. Further, at least part of the recovery device 56 can also be arranged in the duct 38G.

As explained above, in the seventh embodiment, it is also possible to suppress temperature change in the members in the first space SP1 including the X-ray source 2, and suppress temperature change in the first space SP1 per se.

Further, in the seventh embodiment, it is also possible to provide a temperature sensor detecting the temperature of at least one of the X-ray source 2 and the first space SP1 for controlling the supply device 55 based on the detection result of that temperature sensor.

Further, it is also possible to arrange the temperature adjustment member 54 in a flow passage formed in another member than the chamber member 6. For example, the temperature adjustment member 54 can be arranged in the flow passage of a nozzle member arranged in the first space SP1. It is possible to suppress temperature change in the first space SP1 including the X-ray source 2 and the like by supplying the gas through contact with the temperature adjustment member 54 to the X-ray source 2 from a supply port of the nozzle member.

Further, in the seventh embodiment, although a liquid is supplied to the temperature adjustment member 54, a temperature-controlled gas can be supplied instead.

Eighth Embodiment

Next, an eighth embodiment will be explained. In the following explanation, the same reference numerals will be assigned to the constitutive parts or components which are the same as or equivalent to those of the embodiments described above, and the explanations therefor will be simplified or omitted.

Figure 12:
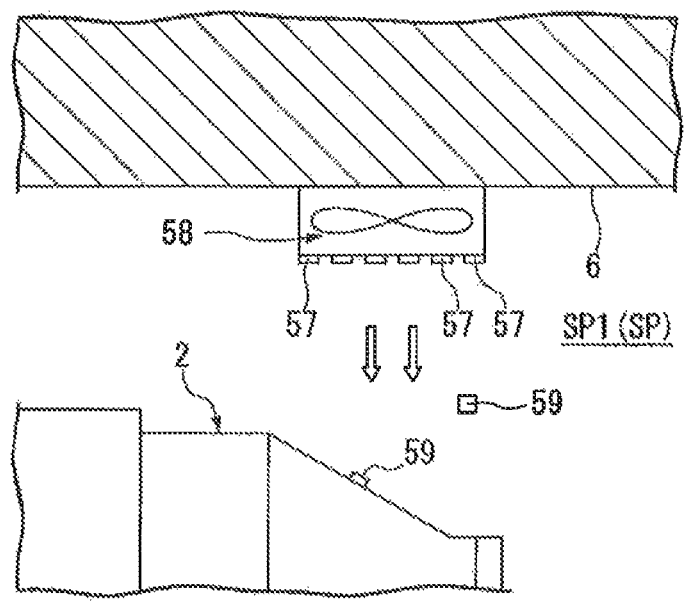
FIG. 12 is a view showing an example of a detection apparatus in accordance with an eighth embodiment.

FIG. 12 is a view showing an example of a detection apparatus 1 in accordance with the eighth embodiment. In FIG. 12, the detection apparatus 1 includes a temperature adjustment member 57 arranged in the first space SP1 to be temperature-controlled. Further, in the eighth embodiment, the detection apparatus 1 includes a generation device 58 which is capable of generating a gas flow and is arranged in the first space SP1. The generation device 58 includes, for example, a blower.

In the eighth embodiment, the temperature adjustment member 57 is arranged between the generation device 58 and the X-ray source 2. The generation device 58 generates the gas flow from the temperature adjustment member 57 toward the X-ray source 2. By virtue of this, the gas temperature-controlled through contact with the temperature adjustment member 57 is supplied to the first space SP1 including the X-ray source 2.

In the eighth embodiment, the temperature adjustment member 57 includes a plurality of temperature adjustment members 57 arranged at intervals. The gas from the generation device 58 flows through the interspaces between the plurality of temperature adjustment members 57 to be supplied to the X-ray source 2.

Each of the temperature adjustment members 57 includes, for example, a Peltier element. The Peltier elements are controlled by the control device 5. The control device 5 controls the temperature adjustment members 57 including the Peltier elements such that the gas to be supplied to the X-ray source 2 can reach a target temperature.

In the eighth embodiment, the detection apparatus 1 includes a temperature sensor 59 detecting the temperature of at least one of the X-ray source 2 and the first space SP1. The control device 5 can control the temperature adjustment members 57 based on the detection result of that temperature sensor 59.

As explained above, in the eighth embodiment, it is also possible to suppress temperature change in the members in the first space SP1 including the X-ray source 2, and suppress temperature change in the first space SP1 per se.

Ninth Embodiment

Next, a ninth embodiment will be explained. In the following explanation, the same reference numerals will be assigned to the constitutive parts or components which are the same as or equivalent to those of the embodiments described above, and the explanations therefor will be simplified or omitted.

Figure 13:
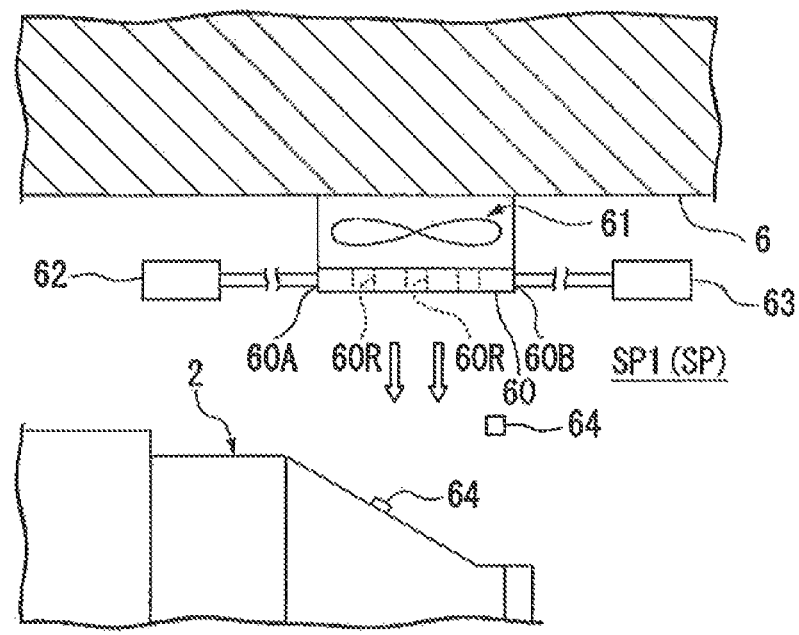
FIG. 13 is a view showing an example of a detection apparatus in accordance with a ninth embodiment.

FIG. 13 is a view showing an example of a detection apparatus 1 in accordance with the ninth embodiment. In FIG. 13, the detection apparatus 1 includes a temperature adjustment member 60 arranged in the first space SP1 to be temperature-controlled. Further, in the ninth embodiment, the detection apparatus 1 includes a generation device 61 which is capable of generating a gas flow and is arranged in the first space SP1. The generation device 61 includes, for example, a blower.

In the ninth embodiment, the temperature adjustment member 60 is arranged between the generation device 61 and the X-ray source 2. The generation device 61 generates the gas flow from the temperature adjustment member 60 toward the X-ray source 2. By virtue of this, the gas temperature-controlled through contact with the temperature adjustment member 60 is supplied to the first space SP1 including the X-ray source 2.

In the ninth embodiment, the detection apparatus 1 has a supply device 62 supplying a temperature-controlled liquid to the temperature adjustment member 60. The supply device 62 operates on, for example, electric power. In the ninth embodiment, the temperature adjustment member 60 has a duct. The duct has an inlet 60A through which the liquid flows in, and an outlet 60B through which the liquid flows out. The temperature adjustment member 60 is made from, for example, a metal.

The supply device 62 is connected with the inlet 60A through another duct. The supply device 62 sends the temperature-controlled liquid to the inlet 60A via the flow passage of this duct. The liquid sent out from the supply device 62 and let through the inlet 60A flows through the duct of the temperature adjustment member 60. By virtue of this, the temperature adjustment member 60 is temperature-controlled with the liquid from the supply device 62.

In the ninth embodiment, the temperature adjustment member 60 has passages 60R through which gas is passable. The gas from the generation device 61 flows through the passages 60R to be supplied to the X-ray source 2.

In the ninth embodiment, the supply device 62 is controlled by the control device 5. The control device 5 controls the supply device 62 such that the gas to be supplied to the X-ray source 2 reaches a target temperature.

In the ninth embodiment, the outlet 60B is connected with a recovery device 63 via still another duct. The liquid flowing through the duct of the temperature adjustment member 60 and out of the outlet 60B is recovered by the recovery device 63 via the flow passage of this duct.

In the ninth embodiment, the recovery device 63 can send the recovered liquid to the supply device 62. The supply device 62 can control the temperature of the liquid from the recovery device 63. Further, the supply device 62 can control the temperature of the liquid from the recovery device 63, and then supply the temperature-controlled liquid to the temperature adjustment member 60.

In the ninth embodiment, the supply device 62 and the recovery device 63 can be arranged outside of the internal space SP or, otherwise, at least part of the supply device 62 can be arranged in the external space RP and/or at least part of the recovery device 63 can be arranged in the external space RP.

In the ninth embodiment, the detection apparatus 1 includes a temperature sensor 64 detecting the temperature of at least one of the X-ray source 2 and the first space SP1. The control device 5 can also control the supply device 62 based on the detection result of that temperature sensor 64. That is, the supply device 62 can also control the temperature of the liquid to be supplied to the temperature adjustment member 60 based on the detection result of the temperature sensor 64.

As explained above, in the ninth embodiment, it is also possible to suppress temperature change in the members in the first space SP1 including the X-ray source 2, and suppress temperature change in the first space SP1 per se.

Further, in the ninth embodiment, although a liquid is supplied to the temperature adjustment member 60, a temperature-controlled gas or aerosol can be supplied instead.

Tenth Embodiment

Next, a tenth embodiment will be explained. In the following explanation, the same reference numerals will be assigned to the constitutive parts or components which are the same as or equivalent to those of the embodiments described above, and the explanations therefor will be simplified or omitted.

Figure 14:
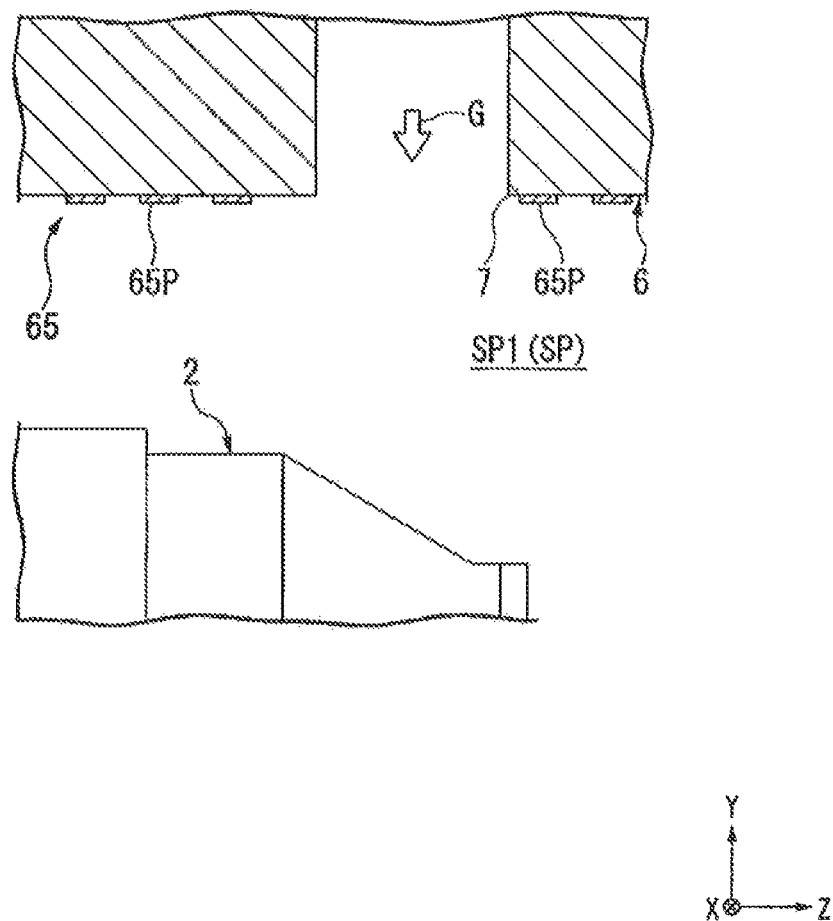
FIG. 14 is a view showing an example of a detection apparatus in accordance with a tenth embodiment.

FIG. 14 is a view showing an example of a detection apparatus 1 in accordance with the tenth embodiment. In FIG. 14, the detection apparatus 1 includes an adjusting device 65 adjusting the temperature of at least part of the chamber member 6 defining the first space SP1.

In the tenth embodiment, the adjusting device 65 includes a plurality of Peltier elements 65P arranged on at least part of the chamber member 6. In the tenth embodiment, the Peltier elements 65P are arranged to face the X-ray source 2. In the tenth embodiment, the Peltier elements 65P are arranged on the internal surface of the chamber member 6 facing with the first space SP1.

Further, at least some of the Peltier elements 65P can be arranged inside the chamber member 6. Further, at least some of the Peltier elements 65P can be arranged on the external surface of the chamber member 6.

The adjusting device 65 is controlled by the control device 5. The control device 5 controls the adjusting device 65 including the Peltier elements 65P such that at least one of the X-ray source 2, the chamber member 6, and the first space SP1 can reach a target temperature.

As explained above, in the tenth embodiment, it is also possible to suppress temperature change in the members in the first space SP1 including the X-ray source 2, and suppress temperature change in the first space SP1 per se.

Further, in the tenth embodiment, it is also possible to provide a temperature sensor detecting the temperature of at least one of the X-ray source 2 and the first space SP1 for controlling the adjusting device 65 based on the detection result of that temperature sensor.

Further, while the chamber member 6 provided with the adjusting device 65 has the supply port 7 in the tenth embodiment, the adjusting device 65 can also be provided on the chamber member 6 without any supply port as explained, for example, with reference to FIGS. 12 and 13.

Eleventh Embodiment

Next, an eleventh embodiment will be explained. In the following explanation, the same reference numerals will be assigned to the constitutive parts or components which are the same as or equivalent to those of the embodiments described above, and the explanations therefor will be simplified or omitted.

FIG. 15 is a view showing an example of a detection apparatus 1 in accordance with the eleventh embodiment. In FIG. 15, the detection apparatus 1 includes an adjusting device 66 adjusting the temperature of at least part of a chamber member 6K defining the first space SP1.

In the eleventh embodiment, the chamber member 6K has a duct 67. In the eleventh embodiment, the duct 67 is arranged in at least some parts surrounding the X-ray source 2. The adjusting device 66 supplies a temperature-controlled fluid to the duct 67 of the chamber member 6K.

In the eleventh embodiment, the adjusting device 66 has a supply device 68 supplying a temperature-controlled liquid to the duct 67. The supply device 68 operates on, for example, electric power. The duct 67 has an inlet 67A through which the liquid flows in, and an outlet 67B through which the liquid flows out.

The supply device 68 is connected with the inlet 67A through another duct. The supply device 68 sends the temperature-controlled liquid to the inlet 67A via the flow passage of this duct. The liquid sent out from the supply device 68 and let through the inlet 67A flows through the duct 67. By virtue of this, the chamber member 6K is temperature-controlled with the liquid from the supply device 68.

In the eleventh embodiment, the supply device 68 is controlled by the control device 5. The control device 5 controls the supply device 68 such that at least one of the X-ray source 2, the chamber member 6, and the first space SP1 can reach a target temperature.

In the eleventh embodiment, the outlet 671 is connected with a recovery device 69 via still another duct. The liquid flowing through the duct 67 and out of the outlet 67B is recovered by the recovery device 69 via the flow passage of this duct.

In the eleventh embodiment, the recovery device 69 can send the recovered liquid to the supply device 68. The supply device 68 can control the temperature of the liquid from the recovery device 69. Further, the supply device 68 can control the temperature of the liquid from the recovery device 69, and then supply the temperature-controlled liquid to the duct 67.

In the eleventh embodiment, the supply device 68 and the recovery device 69 are arranged outside of the internal space SP. However, at least part of the supply device 68 can be arranged in the internal space SP. Further, at least part of the recovery device 69 can also be arranged in the internal space SP.

As explained above, in the eleventh embodiment, it is also possible to suppress temperature change in the members in the first space SP1 including the X-ray source 2, and suppress temperature change in the first space SP1 per se.

Further, in the eleventh embodiment, it is also possible to provide a temperature sensor detecting the temperature of at least one of the X-ray source 2 and the first space SP1 for controlling the supply device 68 based on the detection result of that temperature sensor.

Further, in the eleventh embodiment, although a liquid is supplied to the duct 67, a fluid such as a temperature-controlled gas, aerosol or the like can be supplied instead.

Further, while the chamber member 6 provided with the adjusting device 66 has the supply port 7 in the eleventh embodiment, the adjusting device 66 can also be provided in the chamber member 6 without any supply port as explained, for example, with reference to FIGS. 12 and 13.

Twelfth Embodiment

Next, a twelfth embodiment will be explained. In the following explanation, the same reference numerals will be assigned to the constitutive parts or components which are the same as or equivalent to those of the embodiments described above, and the explanations therefor will be simplified or omitted.

Figure 16:
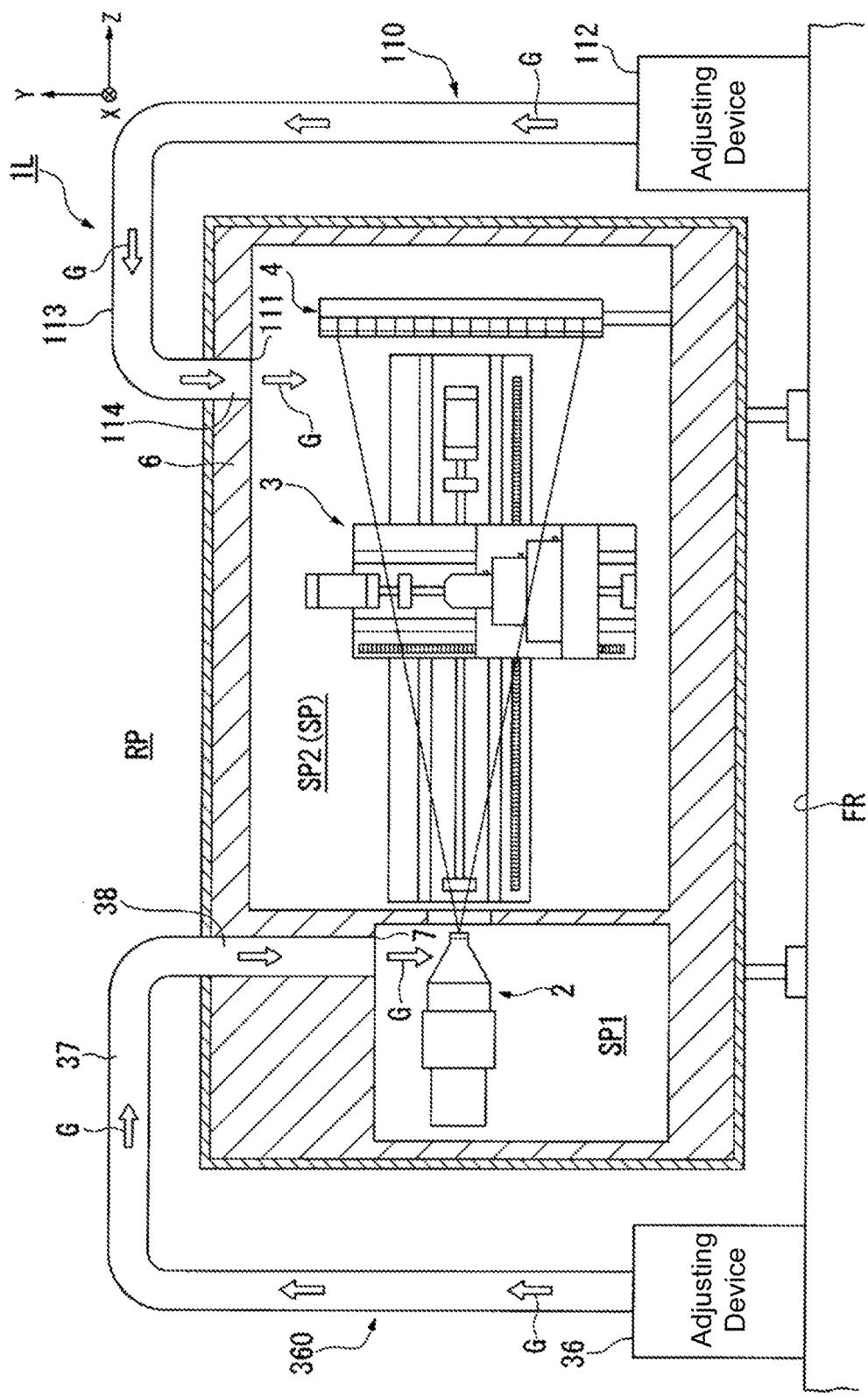
FIG. 16 is a view showing an example of a detection apparatus in accordance with a twelfth embodiment.

FIG. 16 is a view showing an example of a detection apparatus 1L in accordance with the twelfth embodiment. In the twelfth embodiment, the detection apparatus 1L includes an adjusting system 110 adjusting the temperature of the second space SP2. In the twelfth embodiment, the adjusting system 110 is controlled by the control device 5.

In the twelfth embodiment, the adjusting system 110 includes a supply port 111 supplying the temperature-controlled gas G to the second space SP2. The supply port 111 is arranged with the second space SP2. The supply port 111 faces with the second space SP2. In the twelfth embodiment, the supply port 111 supplies the temperature-controlled gas G to at least part of the detector 4. Further, the supply port 111 can also supply the temperature-controlled gas G to, for example, at least part of the stage device 3.

In the twelfth embodiment, the adjusting system 110 includes an adjusting device 112 adjusting the temperature of the gas G. The adjusting device 112 operates on, for example, electric power. The supply port 111 supplies the gas G from the adjusting device 112 to the internal space SP (second space SP2).

In the twelfth embodiment, the adjusting device 112 is arranged in the external space RP of the chamber member 6. In the twelfth embodiment, the adjusting device 112 is arranged on the support surface FR. The adjusting device 112 is connected with a duct 113. The duct 113 is also arranged in the external space RP. The adjusting device 112 is separate from the chamber member 6. At least part of the duct 113 is separate from the chamber member 6.

The chamber member 6 has a duct 114. The duct 114 is formed to link the second space SP2 and the external space RP. The opening at one end of the duct 114 is arranged to face with the external space RP. The opening at the other end of the duct 114 is arranged to face with the second space SP2. The flow passage of the duct 113 is connected with the opening at the one end of the duct 114. In the twelfth embodiment, the opening at the other end of the duct 114 functions as the supply port 111.

In the twelfth embodiment, the adjusting device 112 takes in some gas in the external space RP, for example, to control the temperature of this gas. The gas G temperature-controlled by the adjusting device 112 is sent to the supply port 111 via the flow passage of the duct 113, and the duct 114 of the chamber member 6. The supply port 111 is arranged to face at least one of the detector 4 and the stage device 3. The supply port 111 supplies at least one of the detector 4 and the stage device 3 with the gas G from the adjusting device 112.

As described above, according to the twelfth embodiment, because the adjusting system 110 is provided, it is possible to suppress temperature change in the members in the second space SP2, and suppress temperature change the second space SP2 per se.

Further, in the twelfth embodiment, a discharge port can be provided to discharge at least part of the gas in the second space SP2 from the second space SP2. Further, the gas discharged from this discharge port can be sent to the adjusting device 112. The adjusting device 112 can either include a vacuum system or not include any vacuum system. The adjusting device 112 can forcibly discharge at least part of the gas in the second space SP2 from the discharge port. Further, the gas in the second space SP2 can be discharged naturally from the discharge port. Further, the adjusting device 112 can control the temperature of the gas discharged from the discharge port. Further, the adjusting device 112 can control the temperature of the gas from the discharge port and send the same to the supply port 111. That is, a circulation system circulating the gas can be established by the adjusting device 112, the flow passage of the duct 113, the duct 114, the second space SP2, and the flow passage linking the discharge port and the adjusting device 112. Further, the gas discharged from the discharge port out of the second space SP2 can be let out to the external space RP but not be sent to the adjusting device 112.

Further, in the twelfth embodiment, although the adjusting device 112 is arranged in the external space RP, it is also possible for the whole or part of the adjusting device 112 to be arranged in the internal space SP (the second space SP2). For example, the adjusting device 112 can take in some gas in the internal space SP, control the temperature of this gas, and send the temperature-controlled gas G to the supply port 111.

Further, while the supply port 111 is arranged above (on the +Y side of) the detector 4 (the stage device 3) in the twelfth embodiment, it can alternatively be arranged on the +X or −X or −Y side of the detector 4 (the stage device 3). It is also possible for the discharge port discharging the gas in the second space SP2 to be arranged in an arbitrary position relative to the detector 4 (the stage device 3).

Further, in the twelfth embodiment, the supply port 111 can include a plurality of supply ports 111 which are arranged, for example, along the Z-axis direction.

Further, in the twelfth embodiment, the temperature of the second space SP2 is controlled by the gas G supplied from the supply port 111. However, for example, according to the third to eleventh embodiments described earlier, the temperature of the second space SP2 can otherwise be controlled by the gas supplied from the supply port of a nozzle member arranged in, for example, the second space SP2, or controlled by the gas through contact with a temperature adjustment member, or controlled by Peltier elements, or controlled by a fluid flowing through a duct of the chamber member 6. Further, the temperature of the second space SP2 can still otherwise be controlled based on the detection result of at least one of a temperature sensor detecting the temperature of the members placed in the second space SP2 and a temperature sensor detecting the temperature of the second space SP2.

Further, in the twelfth embodiment, in spite of providing both the adjusting system 360 adjusting the temperature of the first space SP1 and the adjusting system 110 adjusting the temperature of the second space SP2, it is also possible to let the sole adjusting system 360 control both the temperature of the first space SP1 and the temperature of the second space SP2.

Thirteenth Embodiment

Next, a thirteenth embodiment will be explained. In the following explanation, the same reference numerals will be assigned to the constitutive parts or components which are the same as or equivalent to those of the embodiments described above, and the explanations therefor will be simplified or omitted.

Figure 17:
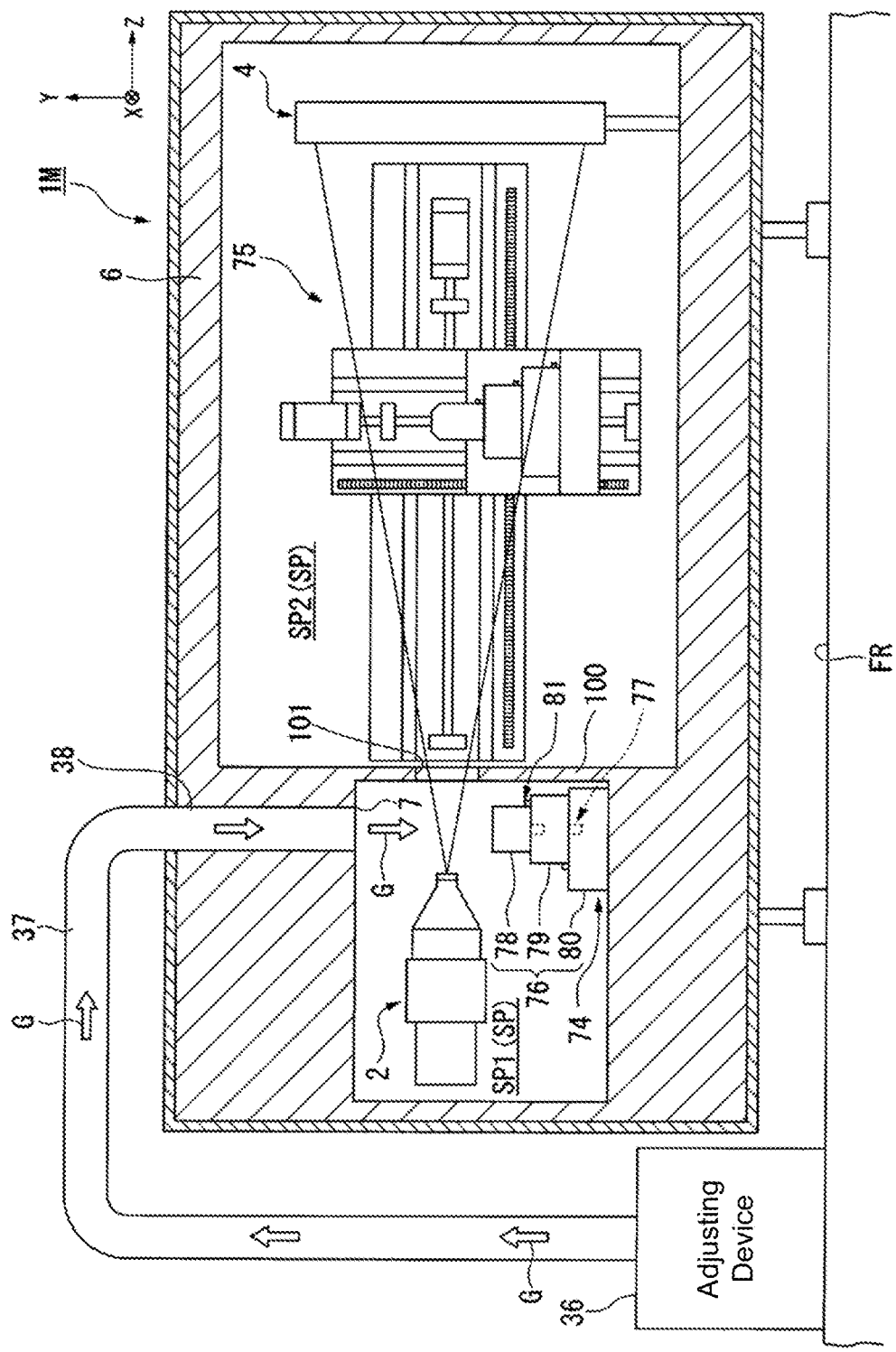
FIG. 17 is a view showing an example of a detection apparatus in accordance with a thirteenth embodiment.

FIG. 17 is a view showing an example of a detection apparatus 1M in accordance with the thirteenth embodiment. The detection apparatus 1M has the chamber member 6 defining the internal space SP.

In the thirteenth embodiment, the internal space SP defined by the chamber member 6 includes the first space SP1 in which the X-ray source 2 is placed and to which the gas G is supplied from the supply port 7, and the second space SP2 in which the detector 4 is placed. The first space SP1 and the second space SP2 are partitioned by the partitionment portion 100. The first space SP1 is spatially close to the X-ray source 2 while the second space SP2 is spatially closer to the detector 4 than the first space SP1. The partitionment portion 100 has the passage portion 101 through which the X-ray XL from the X-ray source 2 is passable. The X-ray XL emitted from the X-ray source 2 is supplied to the second space SP2 via the passage portion 101.

The temperature of the first space SP1 including the X-ray source 2 is controlled with the gas G supplied from the supply port 7 to the first space SP1. Further, in the example shown in FIG. 17, in spite of not providing an adjusting system adjusting the temperature of the second space SP2, it is possible to provide such system.

In the thirteenth embodiment, the detection apparatus 1M includes a first stage device 74 located or disposed in the first space SP1, and a second stage device 75 located or disposed in the second space SP2. The first stage device 74 and the second stage device 75 are arranged in the radiation direction (the Z-axis direction) of the X-ray XL emitted from the X-ray source 2. At least part of the first stage device 74 moves in the first space SP1 close to the X-ray source 2 with respect to the Z-axis direction. At least part of the second stage device 75 moves in the second space SP2 closer to the detector 4 than the first space SP1 with respect to the Z-axis direction.

In the thirteenth embodiment, the second stage device 75 has the same configuration as the stage device 3 explained in the aforementioned embodiments. Further, the measuring system measuring the position of the stage of the second stage device 75 has the same configuration as the measuring system 28 explained in the aforementioned embodiments.

The first stage device 74 includes a stage 76, and a drive system 77 driving the stage 76. The stage 76 includes a table 78 capable of retaining a measuring object, a first movable member 79 movably supporting the table 78, and a second movable member 80 movably supporting the first movable member 79. The first movable member 79 is movable in, for example, the X-axis direction and the like. The second movable member 80 is movable in, for example, the Y-axis direction and the like.

In the thirteenth embodiment, the drive system 77 includes a rotary drive device rotating the table 78, a first drive device moving the first movable member 79, and a second drive device moving the second movable member 79.

In the thirteenth embodiment, by moving the first and second movable members 79 and 80, the table 78 is movable in five directions: the X-axis, Y-axis, θX, θY and θZ directions. In the thirteenth embodiment, the table 78 almost does not move in the Z-axis direction. Further, the table 78 can also be movable in six directions: the X-axis, Y-axis, Z-axis, θX, θY and θZ directions.

In the thirteenth embodiment, the drive system 77 of the first stage device 74 has an actuator with a higher resolution than that of the actuator of the drive system of the second stage device 75. In the thirteenth embodiment, the drive system 77 is provided with the actuator which operates on Lorentz force such as a linear motor, a planar motor, a voice coil motor, or the like.

Further, the drive system 77 of the first stage device 74 can alternatively have an actuator with the same resolution as that of the actuator of the drive system of the second stage device 75.

In the thirteenth embodiment, the detection apparatus 1M includes a measuring system 81 arranged in the first space SP1 to measure the position of the stage 76. In the thirteenth embodiment, the measuring system 81 includes an encoder system.

The measuring system 81 has a rotary encoder measuring the rotational amount of the table 78 (the position with respect to the θY direction), a linear encoder measuring the position of the first movable member 79, and a linear encoder measuring the position of the second movable member 14.

In the thirteenth embodiment, the measuring system 81 measuring the position of the stage 76 of the first stage device 74 has a higher resolution than the measuring system measuring the position of the stage of the second stage device 75. The resolution includes, for example, the resolution of a scale member of the encoder system. The resolution of the scale member includes the scale interval of the scale member. That is, in the thirteenth embodiment, the scale interval of the scale member of the measuring system 81 measuring the position of the stage 76 of the first stage device 74 is lower than that of the scale member of the measuring system measuring the position of the stage of the second stage device 75.

In the thirteenth embodiment, the accuracy in positioning the first stage device 74 can differ from the accuracy in positioning the second stage device 75. The accuracy in positioning includes the precision of an actually stopped position with respect to a target position set for the positioning on the axis of a stage device. Further, the accuracy in positioning can also include a repetitive positioning accuracy indicating a deviational amount at each time of carrying out a repetitive positioning, for example, with respect to the same target position.

Further, the measuring system 81 measuring the position of the stage 76 of the first stage device 74 can alternatively have the same resolution as the measuring system measuring the position of the stage of the second stage device 75.

In the thirteenth embodiment, the temperature of at least part of the first stage device 74 placed in the first space SP1 is controlled with the gas G supplied from the supply port 7 to the first space SP1.

Further, in the thirteenth embodiment, the temperature of at least part of the measuring system 81 placed in the first space SP1 is controlled with the gas G supplied from the supply port 7 to the first space SP1.

Further, in addition to the X-ray source 2, the first stage device 74 and the measuring system 81, the temperature of at least some of the other members placed in the first space SP1 is also controlled with the gas G supplied from the supply port 7 to the first space SP1.

As explained above, in the thirteenth embodiment, because the two stage devices 74 and 75 are provided, it is possible to measure each of the measuring object retained by the first stage device 74 and the measuring object retained by the second stage device 75. In other words, it is possible to measure each of the measuring object placed in the first space SP1 and the measuring object placed in the second space SP2. The detector 4 detects, at a high resolution, an image of the measuring object placed in the first space SP1 close to the X-ray source 2. It detects, at a lower resolution than that of the image of the measuring object placed in the first space SP1, an image of the measuring object placed in the second space SP2 close to the detector 4. Therefore, based on a desired resolution, it is possible to use the two stage devices 74 and 75 in different manners.

Further, in the thirteenth embodiment, the resolution of the measuring system 81 measuring the position of the stage 76 of the first stage device 74 is higher than the resolution of the measuring system measuring the position of the stage of the second stage device 75. That is, the resolution of the measuring system 81 measuring the position of the stage 76 of the first stage device 74 for high resolution is higher than the resolution of the measuring system measuring the position of the stage of the second stage device 75 for low resolution. Therefore, in the case of attempting to acquire an image of the measuring object at high resolution, it is possible to suppress a decrease in the detection accuracy.

Fourteenth Embodiment

Next, a fourteenth embodiment will be explained. In the following explanation, the same reference numerals will be assigned to the constitutive parts or components which are the same as or equivalent to those of the embodiments described above, and the explanations therefor will be simplified or omitted.

Figure 18:
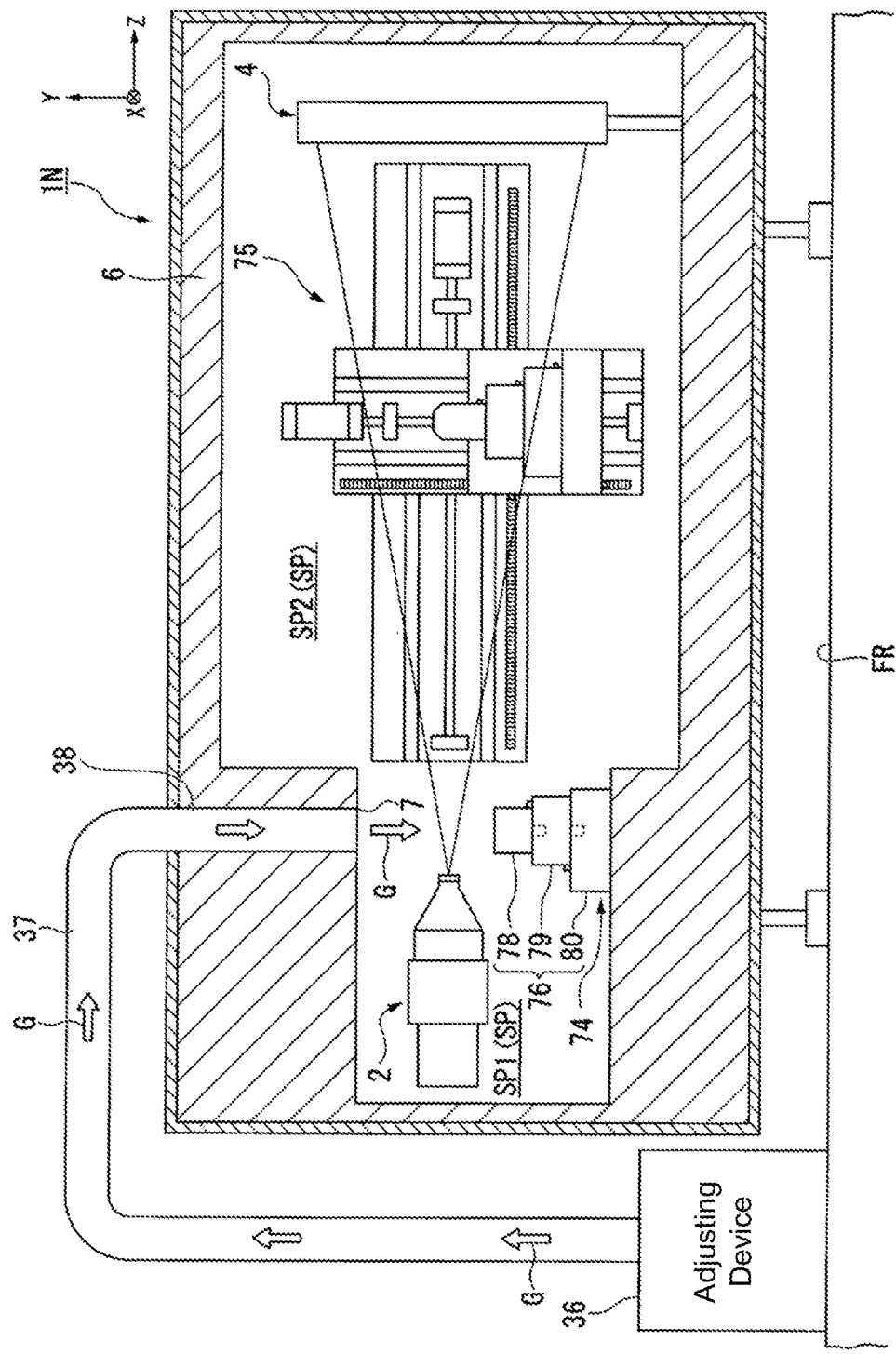
FIG. 18 is a view showing an example of a detection apparatus in accordance with a fourteenth embodiment.

FIG. 18 is a view showing an example of a detection apparatus 1N in accordance with the fourteenth embodiment. As shown in FIG. 18, in the detection apparatus 1L having the first and second stage devices 74 and 75, the partitionment portion 100 can be eliminated. In this case, it is still possible to detect the measuring object at a desired resolution by using at least one of the first stage device 74 placed in the first space SP1 close to the X-ray source 2 with respect to the radiation direction (the Z-axis direction) of the X-ray XL, and the second stage device 75 placed in the second space SP2 closer to the detector 4 than the first space SP1, within the internal space SP. Further, by letting the resolution of the measuring system 81 measuring the position of the stage 76 of the first stage device 74 be higher than the resolution of the measuring system measuring the position of the stage of the second stage device 75, in the case of attempting to acquire an image of the measuring object at high resolution, for example, it is possible to suppress a decrease in the detection accuracy.

Further, in the example shown in FIG. 18, the supply port 7 supplying the temperature-controlled gas G to the first space SP1 can supply the gas G to the X-ray source 2 or supply the gas G to at least part of the first stage device 74 in the first space SP1. Further, the supply port 7 can alternatively supply the gas G to at least part of the second stage device 75 in the second space SP2. Further, the supply port 7 can be left out.

Fifteenth Embodiment

Figure 19:
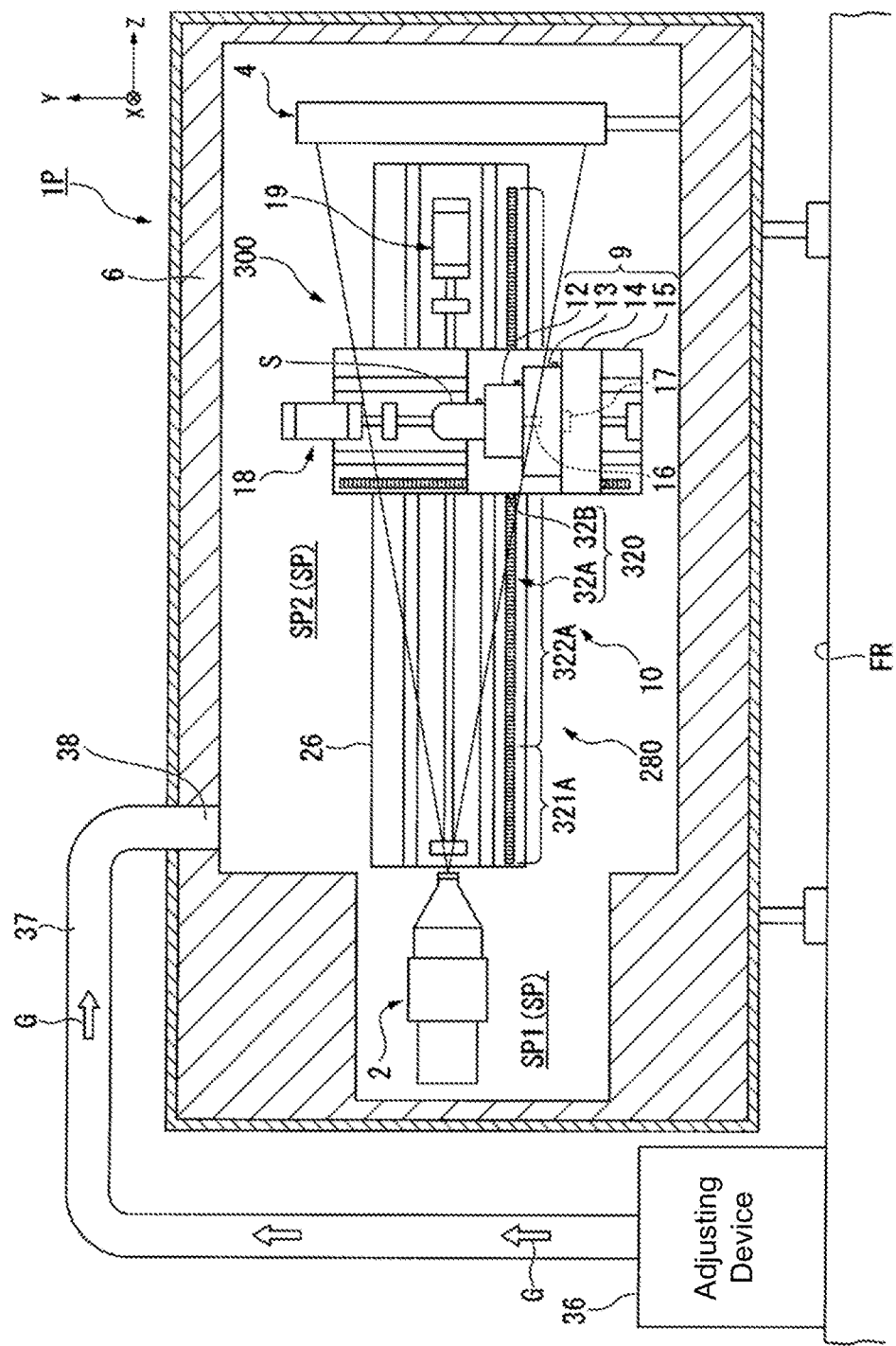
FIG. 19 is a view showing an example of a detection apparatus in accordance with a fifteenth embodiment.

Next, a fifteenth embodiment will be explained. FIG. 19 is a view showing an example of a detection apparatus 1P in accordance with the fifteenth embodiment.

In FIG. 19, the detection apparatus 1P includes the chamber member 6 defining the internal space SP, the X-ray source 2, a stage device 300, and the detector 4. The internal space SP includes the first space SP1 spatially close to the X-ray source 2 in the radiation direction of the X-ray XL, and the second space SP2 spatially closer to the detector 4 than the first space SP1.

In the fifteenth embodiment, the X-ray source 2 is arranged in the first space SP1, while the detector 4 is arranged in the second space SP2.

The stage device 300 includes the movable stage 9 retaining the measuring object S, and the drive system 10 moving the stage 9. In the fifteenth embodiment, the stage 9 moves in the first space SP1 and second space SP2.

Further, in the fifteenth embodiment, the detection apparatus 1P includes the supply port 7 supplying the temperature-controlled gas G to the first space SP1. It is possible for the supply port 7 to supply the gas G to the X-ray source 2. Further, it is also possible for the supply port 7 to supply the gas G to at least part of the stage 9 placed in the first space SP1.

The stage 9 has the table 12 having the retention portion 11 retaining the measuring object S, the first movable member 13 movably supporting the table 12, the second movable member 14 movably supporting the first movable member 13, and the third movable member 15 movably supporting the second movable member 14.

The drive system 10 includes the rotary drive device 16 rotating the table 12 on the first movable member 13, the first drive device 17 moving the first movable member 13 in the X-axis direction on the second movable member 14, the second drive device 18 moving the second movable member 14 in the Y-axis direction, and the third drive device 19 moving the third movable member 15 in the Z-axis direction.

The stage 9 and the drive system 10 of the stage device 300 have the same configurations as the stage 9 and the drive system 10 of the stage device 3 explained in the aforementioned embodiments, respectively.

The detection apparatus 1P has the base member 26. The base member 26 is supported by the chamber member 6. In the fifteenth embodiment, the base member 26 is supported by the inner wall (inner surface) of the chamber member 6 via the support mechanism. The position of the base member 26 is substantially fixed.

In the fifteenth embodiment, the detection apparatus 1P includes a measuring system 280 which measures the position of the stage 9. In the fifteenth embodiment, the measuring system 280 includes an encoder system.

The measuring system 280 has a rotary encoder measuring the rotational amount of the table 12 (the position with respect to the θY direction), a linear encoder measuring the position of the first movable member 13 with respect to the X-axis direction, and a linear encoder measuring the position of the second movable member 14 with respect to the Y-axis direction. Further, the measuring system 280 has a linear encoder 320 measuring the position of the third movable member 15 with respect to the Z-axis direction.

The linear encoder 320 includes the scale member 32A arranged on the base member 26, and the encoder head 32B arranged on the third movable member 15 to detect the scale of the scale member 32A. The scale member 32A is fixed on the base member 26. The encoder head 32B is fixed on the third movable member 15. The encoder head 32B can measure the position of the third movable member 15 relative to the scale member 32A (the base member 26).

In the fifteenth embodiment, the scale member 32A is arranged in the first space SP1 and second space SP2. In the fifteenth embodiment, the scale member 32A includes a first portion 321A arranged in the first space SP1, and a second portion 322A arranged in the second space SP2.

In the fifteenth embodiment, the resolution of the linear encoder 320 in the first space SP1 is higher than the resolution of the linear encoder 320 in the second space SP2. In the fifteenth embodiment, the scale interval of the first portion 321A placed in the first space SP1 is smaller than the scale interval of the second portion 322A placed in the second space SP2.

As explained above, in the fifteenth embodiment, because the stage 9 moves in the first space SP1 and second space SP2, by retaining the measuring object on the stage 9, it is possible to measure each of the measuring object situated in the first space SP1 and the measuring object situated in the second space SP2. The detector 4 detects, at a high resolution, an image of the measuring object situated in the first space SP1 close to the X-ray source 2. It detects, at a lower resolution than that of the image of the measuring object situated in the first space SP1, an image of the measuring object situated in the second space SP2 close to the detector 4.

Further, in the fifteenth embodiment, the resolution of the linear encoder 320 measuring the position of the stage 9 is higher in the first space SP1 than in the second space SP2. Therefore, in the case of attempting to acquire an image of the measuring object at high resolution, it is possible to suppress a decrease in the detection accuracy.

Sixteenth Embodiment

Next, a sixteenth embodiment will be explained. In the following explanation, the same reference numerals will be assigned to the constitutive parts or components which are the same as or equivalent to those of the embodiments described above, and the explanations therefor will be simplified or omitted.

Figure 20:
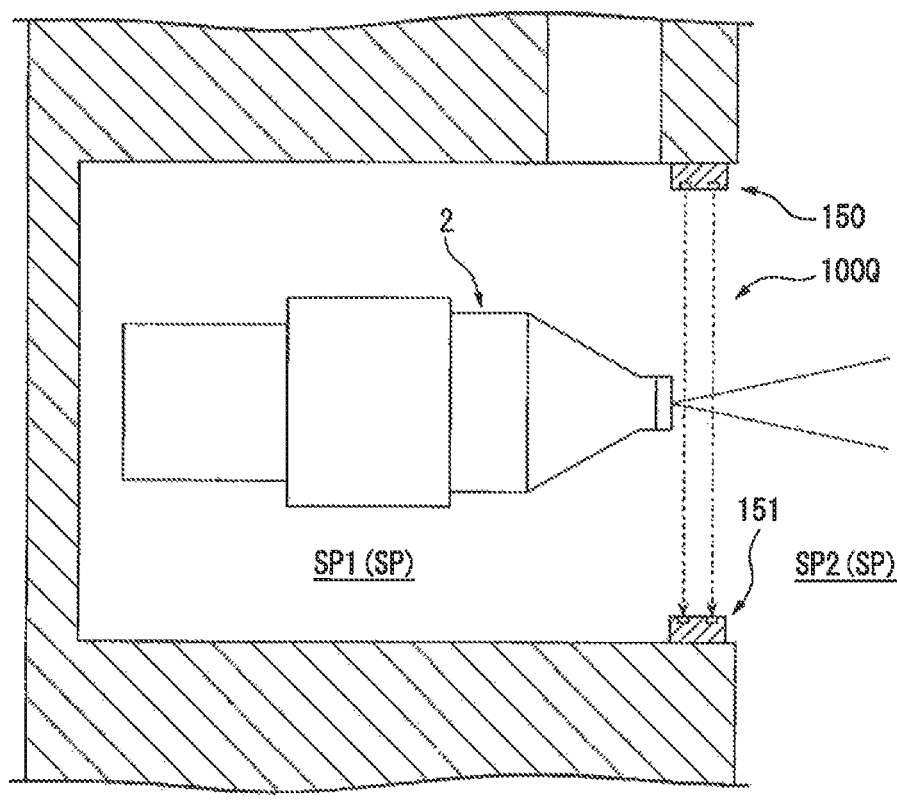
FIG. 20 is a view showing an example of a detection apparatus in accordance with a sixteenth embodiment.

FIG. 20 is a view showing an example of a detection apparatus 1Q in accordance with the sixteenth embodiment. FIG. 20 shows an example of a partitionment portion (a separator or a dividing portion) 100Q dividing the internal space SP into the first space SP1 and the second space SP2.

In FIG. 20, the partitionment portion 100Q has a gas supply portion 150 supplying a gas in a direction intersecting the radiation direction of the X-ray XL (the Z-axis direction). In the sixteenth embodiment, the gas supply portion 150 is arranged in at least a part surrounding the optical path (X-ray path) of the X-ray XL emitted from the X-ray source 2. In FIG. 20, the gas supply portion 150 is arranged on the +Y side with respect to the optical path of the X-ray XL. The gas supply portion 150 has a plurality of supply ports supplying the gas. The gas supply portion 150 supplies the gas in the Y-axis direction (−Y direction) intersecting the radiation direction of the X-ray XL (the X-axis direction).

In the sixteenth embodiment, the partitionment portion 100Q has a gas recovery portion 151 arranged to face the gas supply portion 150. The gas recovery portion 151 is arranged on the −Y side with respect to the optical path of the X-ray XL. The gas recovery portion 151 has a plurality of recovery ports recovering (sucking in) the gas. The gas recovery portion 151 recovers at least part of the gas from the gas supply portion 150.

In the sixteenth embodiment, along with at least part of the supply of the gas from the gas supply portion 150, the gas recovery portion 151 recovers the gas. In the sixteenth embodiment, a so-called gas curtain is formed of the gas supplied from the gas supply portion 150. That is, in the sixteenth embodiment, the partitionment portion 100Q includes this gas curtain. The gas curtain suppresses or prevents a fluid from moving from one of the first space SP1 and the second space SP2 to the other.

As explained above, according to the sixteenth embodiment, by virtue of the partitionment portion 100Q including the gas curtain, even when temperature changes in the first space SP1, it is still possible to suppress temperature change in the second space SP2.

Seventeenth Embodiment

Next, a seventeenth embodiment will be explained. In the following explanation, the same reference numerals will be assigned to the constitutive parts or components which are the same as or equivalent to those of the embodiments described above, and the explanations therefor will be simplified or omitted.

Figure 21:
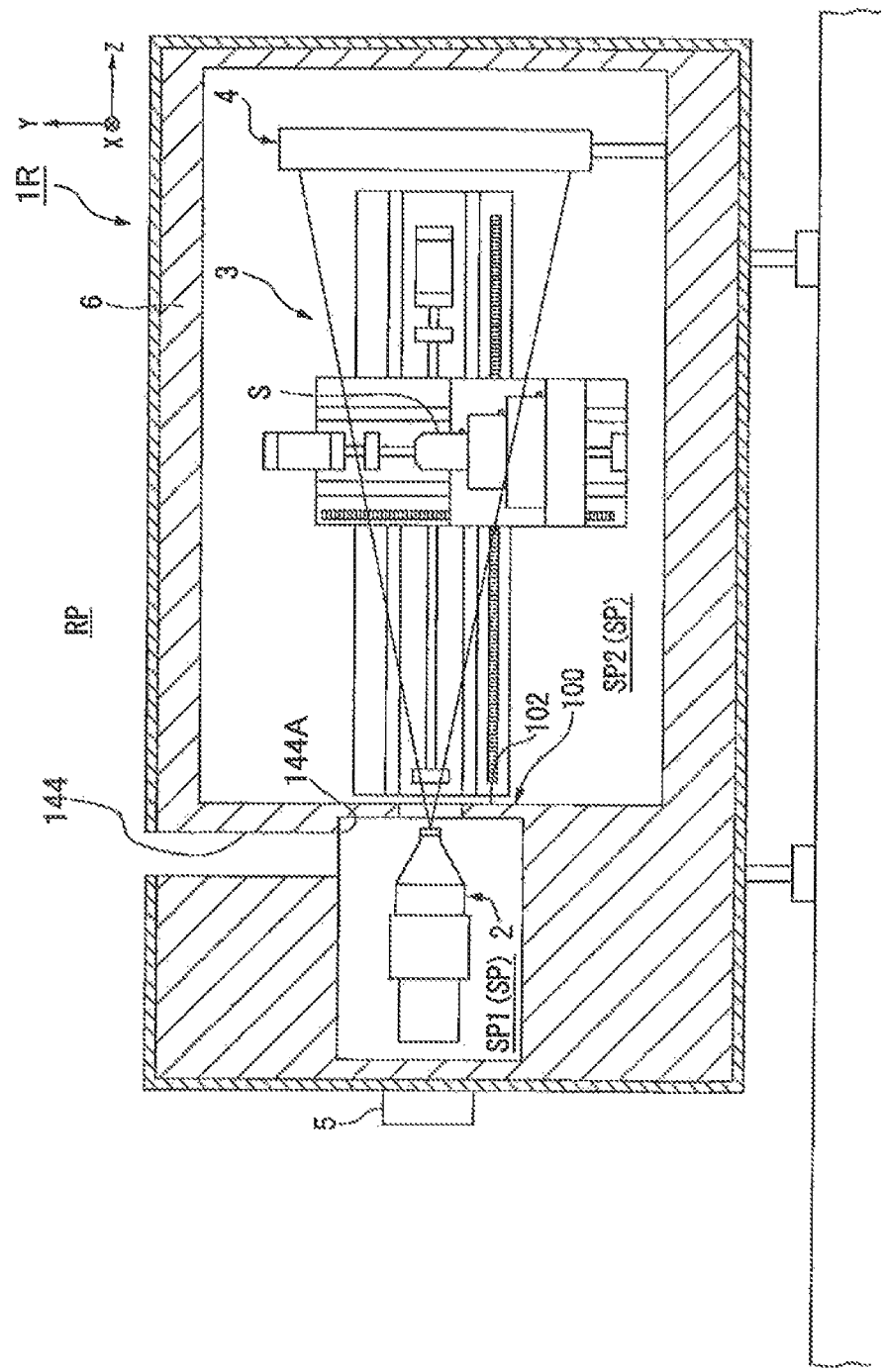
FIG. 21 is a view showing an example of a detection apparatus in accordance with a seventeenth embodiment.

FIG. 21 is a view showing an example of a detection apparatus 1R in accordance with the seventeenth embodiment. The detection apparatus 1R in accordance with the seventeenth embodiment is not provided with any supply port supplying a temperature-controlled gas and the like, but, as will be described later, with a discharge port discharging the gas in the first space SP1. As shown in FIG. 21, the partitionment portion 100 divides the internal space SP into the first space SP1 and the second space SP2. Then, the chamber member 6 is provided with a duct 144 defining an exhaust flow passage letting the first space SP1 communicate with the external space RP. The duct 144 has a discharge port 144A which is an opening at the side of the first space SP1 and is arranged above the X-ray source 2 (in the +Y direction). The duct 144 is formed to extend upward from the discharge port 144A (in the +Y direction).

When the gas surrounding the X-ray source 2 is warmed by the heat produced by operating the X-ray source 2, then the gas surrounding the X-ray source 2 decreases in specific gravity and thus moves upward. Here, as described above, because the discharge port 144A is arranged above the X-ray source 2 while the duct 144 extends upward, it is possible to efficiently discharge the warmed gas surrounding the X-ray source 2 to the external space RP through the duct 144. At this time, because the gas surrounding the X-ray source 2 is subjected to an exchange, it is possible to suppress local temperature rise in the first space SP1. That is, it is possible to suppress temperature rise in the members, of the detection apparatus 1R, placed in the first space SP1, and suppress the possibility of thermal distortion in those members. By virtue of this, it is possible to suppress a decrease in the detection accuracy of the detection apparatus 1R.

Further, the discharge port 144A need not necessarily be arranged above the X-ray source 2 but, for example, can be arranged below the X-ray source 2. In such case, it is also possible to discharge the gas surrounding the X-ray source 2 to the external space RP through the discharge port 144A. Further, a generation device (such as a blower or the like) can be provided to generate a gas flow for causing the gas surrounding the X-ray source 2 to move toward the discharge port 144A. Further, the duct 144 need not necessarily have a linear shape but, as required, can have any shape. Further, the chamber member 6 can be formed with a plurality of ducts 144 and a plurality of discharge ports 144A, but not necessarily with only one duct 144 (and one discharge port 144A).

Figure 22:
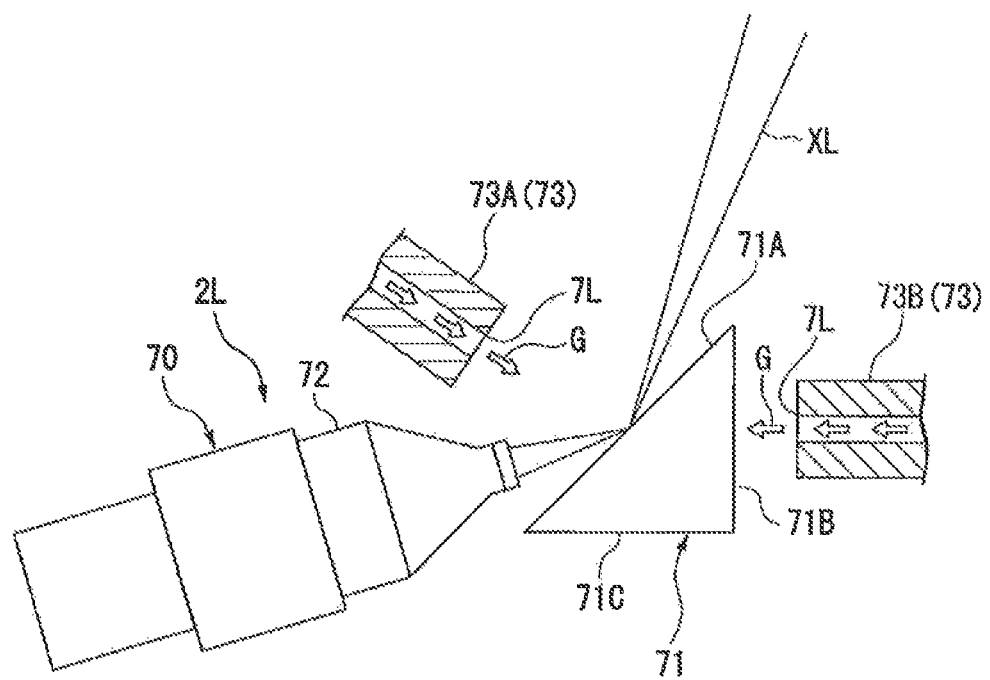
FIG. 22 is a view showing an example of another X-ray source.

Further, while the X-ray source 2 is of a so-called transmission type in the above first to seventeenth embodiments, it can alternatively be of a reflection type. FIG. 22 is a view showing an example of an X-ray source 2L of the reflection type.

In FIG. 22, the X-ray source 2L has an electron emission portion 70 including a filament and an electron conduction member, and a target 71. In the seventeenth embodiment, the electron emission portion 70 includes a housing 72 accommodating the filament and the electron conduction member. The target 71 is arranged outside of the housing 72 (the electron emission portion 70). The electron conduction member of the electron emission portion 70 conducts electrons generated from the filament to the target 71. The electrons from the electron emission portion 70 collide against the target 71. The target 71 generates the X-ray XL by the collision of the electrons.

In the seventeenth embodiment, the target 71 has a first surface 71A irradiated with the electrons from the electron emission portion 70, and a second surface 71B and a third surface 71C which face in different directions from the first surface 71A. In the seventeenth embodiment, the first surface 71A is irradiated with the electrons to generate the X-ray XL.

Further, in the example shown in FIG. 22, there is arranged a nozzle member 73 which has supply ports 7L supplying the temperature-controlled gas G to the target 71. In the seventeenth embodiment, the nozzle member 73 includes a first nozzle member 73A having one supply port 7L supplying the gas G to the first surface 71A, and a second nozzle member 73B having the other supply port 7L supplying the gas G to the second surface 71B. The supply port 7L of the first nozzle member 73A faces the first surface 71A. The supply port 7L of the second nozzle member 73B faces the second surface 71B.

Further, another supply port 7L can be arranged to supply the gas G to the third surface 71C. Further, while the gas G is supplied to the first surface 71A, it is possible not to supply the gas G to the second and third surfaces 71B and 71C, or while the gas G is supplied to the second surface 71B, it is possible not to supply the gas G to the first and third surfaces 71A and 71C, or while the gas G is supplied to the third surface 71C, it is possible not to supply the gas G to the first and second surfaces 71A and 71B. Further, while the gas G is supplied to the second and third surfaces 71B and 71C, it is possible not to supply the gas G to the first surface 71A, or while the gas G is supplied to the first and third surfaces 71A and 71C, it is possible not to supply the gas G to the second surface 71B.

Further, while the temperature-controlled gas is supplied to the X-ray source in each of the above embodiments, it can alternatively be supplied to, for example, at least part of the stage device or at least part of the measuring system. For example, the temperature-controlled gas can be supplied to the scale member of the measuring system.

Further, in each of the above embodiments, it is possible to provide a first supply port supplying the temperature-controlled gas to the X-ray source, and a second supply port supplying the temperature-controlled gas to at least part of the stage device. Further, in each of the above embodiments, it is possible to provide the first supply port supplying the temperature-controlled gas to the X-ray source, and a third supply port supplying the temperature-controlled gas to at least part of the measuring system.

Further, in each of the above embodiments, at least when the X-ray XL is being emitted from the X-ray source, the temperature-controlled gas is supplied to the X-ray source. However, even when the X-ray XL is being emitted from the X-ray source, the supply and stop of the supply of the temperature-controlled gas can be carried out based on, for example, the position of the stage retaining the measuring object. For example, when the stage is situated close to the X-ray source (when the distance between the stage and the X-ray source is a first distance in the Z-axis direction), then it is possible to supply the temperature-controlled gas to the X-ray source. On the other hand, when the stage is situated far from the X-ray source (when the distance between the stage and the X-ray source is a second distance longer than the first distance in the Z-axis direction), then it is possible to stop supplying the gas to the X-ray source. Alternatively, when the distance between the stage and the X-ray source in the Z-axis direction is shorter than a threshold value, then it is possible to supply the temperature-controlled gas to the X-ray source but, on the other hand, when the distance is longer than the threshold value, then it is possible to stop supplying the gas to the X-ray source. In other words, it is possible to supply the temperature-controlled gas to the X-ray source for detecting (measuring) the measuring object S at high resolution, but stop supplying the gas to the X-ray source for detecting (measuring) the measuring object S at low resolution.

Further, in each of the above embodiments, the X-ray XL emitted from the X-ray source is exactly an X-ray, and the detection apparatus 1 is an X-ray CT inspection device. However, the electromagnetic wave emitted from the X-ray source can be an electromagnetic wave with a different wavelength from that of X-ray. That is, although it is a matter of course that the electromagnetic wave emitted from the X-ray source can be an X-ray (in the broad sense of the term) such as the aforementioned ultrasoft X-ray, soft X-ray, X-ray, hard X-ray, or the like, the electromagnetic wave can have either a longer or a shorter wavelength than those X-rays in the broad sense as long as it is transmittable through the measuring object. Every element explained in each of the above embodiments is also applicable to any device using an electromagnetic wave with a different wavelength from that of X-ray only when that device is used to detect a transmission electromagnetic wave transmitted through the measuring object.

Further, while the detection apparatus 1 has an X-ray source in each of the above embodiments, the X-ray source can be an external device for the detection apparatus 1. In other words, it is also possible for the X-ray source not to constitute at least a part of the detection apparatus.

Eighteenth Embodiment

Next, an eighteenth embodiment will be explained. In the following explanation, the same reference numerals will be assigned to the constitutive parts or components which are the same as or equivalent to those of the embodiments described above, and the explanations therefor will be simplified or omitted.

In the eighteenth embodiment, an explanation will be given on a structure manufacturing system including the detection apparatus 1 described above.

Figure 23:
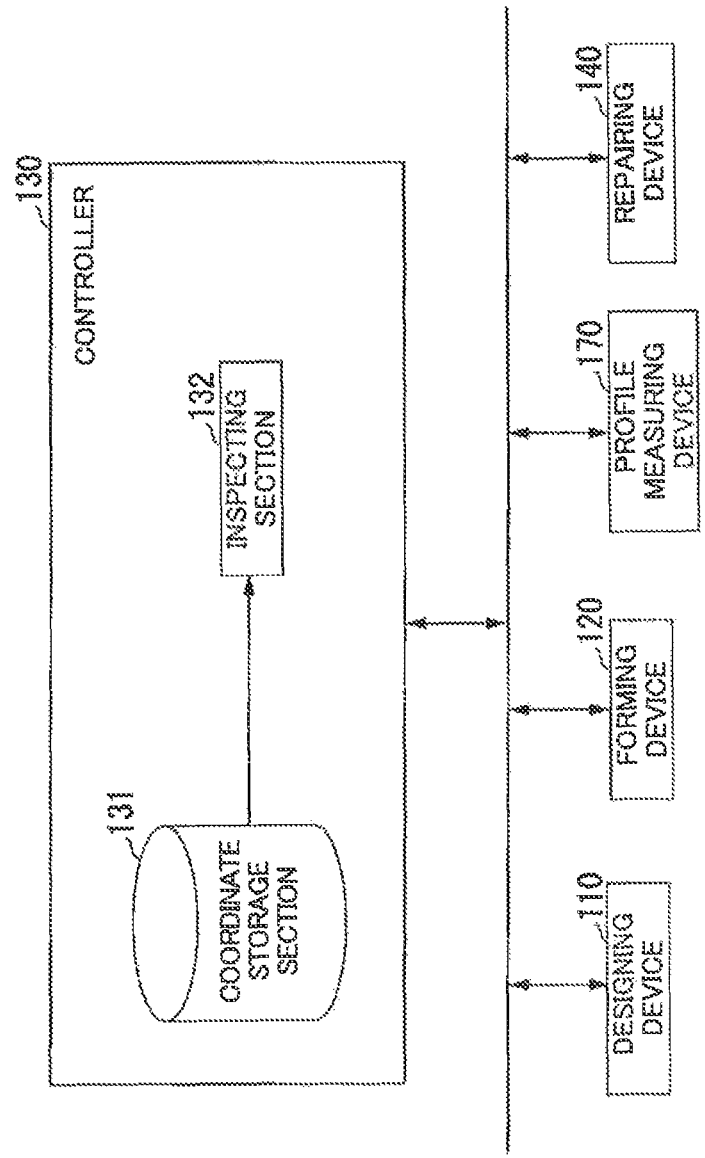
FIG. 23 is a block diagram of configuration of a structure manufacturing system.

FIG. 23 is a block diagram of configuration of a structure manufacturing system 200. The structure manufacturing system 200 includes the aforementioned position measuring device 100, a probe device 50 probing a measuring object of the position measuring device 100, a designing device 110, a forming device 120, a controller (inspection device) 130, and a repairing device 140. In the eighteenth embodiment, the structure manufacturing system 200 manufactures molded components such as automobile door parts, engine components, gear components, electronic components including circuit substrates, etc.

The designing device 110 creates design information about the profile of a structure, and sends the created design information to the forming device 120. Further, the designing device 110 causes an aftermentioned coordinate storage portion 131 of the controller 130 to store the created design information. The design information mentioned here refers to information indicating the coordinates of each position of the structure. The forming device 120 fabricates the structure based on the design information inputted from the designing device 110. The formation process of the forming device 120 includes casting, forging, cutting, and the like.

The detection apparatus 1 sends information indicating measured coordinates to the controller 130. Further, the probe device 50 measures the coordinates of the fabricated structure (measuring object) and sends the information indicating the measured coordinates to the controller 130. The controller 130 includes the coordinate storage portion 131 and an inspection section 132. The coordinate storage portion 131 stores the design information from the designing device 110. The inspection section 132 reads out the design information from the coordinate storage portion 131. The inspection section 132 creates information (profile information) signifying the fabricated structure from the information indicating the coordinates received from the detection apparatus 1. The inspection section 132 compares the information (the profile information) indicating the coordinates received from a profile measuring device 170 with the design information read out from the coordinate storage portion 131. Based on the comparison result, the inspection section 132 determines whether or not the structure is formed in consistency with the design information. In other words, the inspection section 132 determines whether or not the fabricated structure is nondefective. When the structure is not formed in consistency with the design information, then the inspection section 132 determines whether or not it is repairable. When it is repairable, then the inspection section 132 calculates to specify the defective portions and repairing amount based on the comparison result, and sends information indicating the defective portions and repairing amount to the repairing device 140.

Based on the information indicating the defective portions and repairing amount received from the controller 130, the repairing device 140 processes the defective portions of the structure.

Figure 24:
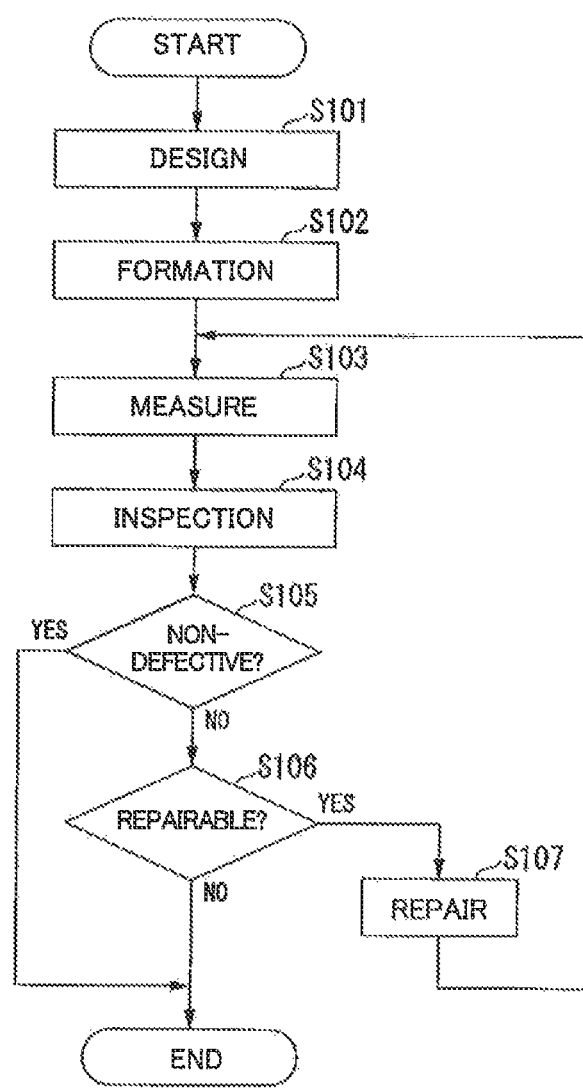
FIG. 24 is a flowchart showing a processing flow according to the structure manufacturing system.

FIG. 24 is a flowchart showing a processing flow according to the structure manufacturing system 200. First, the designing device 110 creates design information about the profile of a structure (step S101). Next, the forming device 120 fabricates the structure based on the design information (step S102). Then, the detection apparatus 1 measures the coordinates with respect to the profile of the structure (step S103). Then, the inspection section 132 of the controller 130 inspects whether or not the structure is fabricated in consistency with the design information by comparing the created profile information of the structure from the detection apparatus 1 with the above design information (step S104).

Next, the inspection section 132 of the controller 130 determines whether or not the fabricated structure is nondefective (step S105). When the fabricated structure is nondefective (step S106: Yes), then the structure manufacturing system 200 ends the process. On the other hand, when the fabricated structure is defective (step S106: No), then the inspection section 132 of the controller 130 determines whether or not the fabricated structure is repairable (step S107).

When the fabricated structure is repairable (step S107: Yes), then the repairing device 140 reprocesses the structure (step S108), and the process returns to step S103. On the other hand, when the fabricated structure is not repairable (step S107: Yes), then the structure manufacturing system 200 ends the process. With that, the process of the flowchart is ended.

In the above manner, because the profile measuring device 170 in the eighteenth embodiment can correctly measure the coordinates of the structure, the structure manufacturing system 200 is able to determine whether or not the fabricated structure is nondefective. Further, when the structure is defective, the structure manufacturing system 200 is able to reprocess the structure to repair the same.

Further, in each of the above embodiments, the measuring object S is not limited to a component for industrial use, but can be a human body, etc. Further, in each of the above embodiments, the X-ray apparatus 1 can also be used for medical purposes.

In each of the above embodiments, the X-ray source and the detection apparatus are fixed in predetermined positions, and an image of the measuring object S is acquired by rotating the stage. However, the scanning method is not limited to this. It is possible to fix one of the X-ray source and the detection apparatus in a predetermined position, and let the other be movable. Further, it is also possible for both the X-ray source and the detection apparatus to be movable.

Further, it is possible to appropriately combine the requirements of the respective embodiments described above. Further, there can be some cases of not using some of the components. Further, in so far as permitted by laws and regulations, the present description incorporates, as a part thereof, all the disclosures of the Japanese patent publications and U.S. patents with respect to the X-ray detection apparatuses and the like, cited in the respective embodiments and modifications described above.

The present teaching is applicable to structure manufacturing systems capable of determining whether or not a manufactured structure is nondefective. By virtue of this, it is possible to improve inspection precision for the manufactured structure, and thereby improve the efficiency of manufacturing the structure.

What is claimed is:
1. A profile measuring apparatus configured to measure a profile of an object by irradiating the object with an X-ray and detecting a transmission X-ray transmitted through the object, comprising:
an X-ray source configured to emit the X-ray including:
a filament configured to generate electrons, a target configured to generate the X-ray by bombardment of electrons, an electron conduction member configured to conduct the electrons to the target, a housing accommodating at least a part of the electron conduction member, and a duct in which a temperature-controlled fluid is to flow so that heat of the housing is cooled by the temperature-controlled fluid flowing in the duct;

a stage configured to retain the object;

a detector configured to detect at least a part of the X-ray which is emitted from the X-ray source and has passed through the object;

a chamber member defining an internal space in which the X-ray source, the stage, and the detector are placed;

a partition configured to divide the internal space into a first space in which the X-ray source is placed and a second space in which the detector is placed; and a supply port through which a temperature-controlled gas that is different from the temperature-controlled fluid is supplied to a part of an outer surface of the housing or the target, the supply port being placed in the first space, and wherein the partition is configured to restrain the temperature-controlled gas from flowing to the second space in which the detector is placed.

2. The profile measuring apparatus according to claim 1, wherein the partition includes a partitioning member arranged in at least a partial portion between the X-ray source and the detector.

3. The profile measuring apparatus according to claim 2, wherein the partitioning member has an opening through which the X-ray emitted from the X-ray source is passable.

4. The profile measuring apparatus according to claim 1, wherein the partition includes a gas supply portion arranged on an inner surface of the chamber and configured to supply the temperature-controlled gas in a direction intersecting a radiation direction of the X-ray.

5. The profile measuring apparatus according to claim 1, further comprising a first temperature regulator having an outlet connected to the supply port and configured to control temperature of the first space.

6. The profile measuring apparatus according to claim 5, wherein the first temperature regulator controls temperature of a member placed in the supply port.

7. The profile measuring apparatus according to claim 5, further comprising a first temperature sensor configured to detect temperature of at least one of the first space and a member placed in the first space, wherein the first temperature regulator is configured to supply the temperature-controlled fluid to the supply port based on a detection result of the first temperature sensor.

8. The profile measuring apparatus according to claim 1, further comprising a second temperature regulator having an outlet connected to the second space and configured to control temperature of the second space.

9. The profile measuring apparatus according to claim 1, wherein at least a part of the stage is arranged in the second space.

10. The profile measuring apparatus according to claim 1, wherein the stage includes a first stage arranged in the first space, and a second stage arranged in the second space.

11. The profile measuring apparatus according to claim 10, further comprising a first measuring device arranged in the first space to measure position of the first stage, and a second measuring device arranged in the second space to measure position of the second stage, wherein the first measuring device has a higher resolution than the second measuring device.

12. The profile measuring apparatus according to claim 11, wherein the first measuring device includes a first scale member which is arranged in the first space and has a scale formed by a first interval, and a first detector arranged on at least a part of the first stage to detect the scale of the first scale member; the second measuring device includes a second scale member which is arranged in the second space and has a scale formed by a second interval, and a second detector arranged on at least a part of the second stage to detect the scale of the second scale member; and the resolution includes the intervals of the scales, the first interval is smaller than the second interval.

13. The profile measuring apparatus according to claim 1, wherein in a portion of the chamber member defining the first space, a first discharge port is formed to discharge at least a part of a gas contained in the in the first space.

14. The profile measuring apparatus according to claim 13, wherein the chamber member comprises a discharge duct connected to the first discharge port, and the first discharge port is arranged above the X-ray source.

15. The profile measuring apparatus according to claim 1, wherein the electron conduction member is an electron lens or a deflector.

16. The profile measuring apparatus according to claim 1, wherein the chamber member defining the internal space is configured to prevent the X-ray generated by the X-ray source from being leaked into outside of the chamber member.

17. The profile measuring apparatus according to claim 1, wherein the supply port is placed at a position, in the first space, facing the X-ray source.

18. A profile measuring method, performed by a profile measuring apparatus configured to measure a profile of an object by irradiating the object with an X-ray and detecting a transmission X-ray transmitted through the object, the method comprising:

emitting the X-ray using an X-ray source including:

a filament configured to generate electrons, a target configured to generate the X-ray by bombardment of electrons, an electron conduction member configured to conduct the electrons to the target, a housing accommodating at least a part of the electron conduction member, and a duct in which a temperature-controlled fluid is to flow so that heat of the housing is cooled by the temperature-controlled fluid flowing in the duct;

retaining the object using a stage;

detecting at least a part of the X-ray which is emitted from the X-ray source and has passed through the object;

defining, using a chamber member, an internal space in which the X-ray source, the stage, and the detector are placed;

dividing, using a partition, the internal space into a first space in which the X-ray source is placed and a second space in which the detector is placed; and supplying a temperature-controlled gas that is different from the temperature-controlled fluid is supplied from a supply port to a part of an outer surface of the housing or the target, the supply port being placed in the first space, and wherein the partition is configured to restrain the temperature-controlled gas from flowing to the second space in which the detector is placed.

\* \* \* \* \*